US011720999B2

(12) United States Patent
Anger et al.

(10) Patent No.: US 11,720,999 B2
(45) Date of Patent: Aug. 8, 2023

(54) METHOD, DEVICE AND NON-TRANSITORY COMPUTER-READABLE STORAGE MEDIUM FOR INCREASING THE RESOLUTION AND DYNAMIC RANGE OF A SEQUENCE OF RESPECTIVE TOP VIEW IMAGES OF A SAME TERRESTRIAL LOCATION

(71) Applicant: KAYRROS, Paris (FR)

(72) Inventors: Jeremy Anger, Bourg-la-reine (FR); Thibaud Briand, Le Kremlin-Bicetre (FR); Sylvain Calisti, Paris (FR); Carlo De Franchis, Paris (FR); Thibaud Ehret, Champigny sur Marne (FR); Gabriele Facciolo, Cachan (FR); Guillaume Lostis, Paris (FR); Jean-Michel Morel, Paris (FR)

(73) Assignee: Kayrros ( * ) Notice: Subject to any disclaimer, the term of this patent is extended or adjusted under 35 U.S.C. 154(b) by 0 days.

(21) Appl. No.: 17/067,002

(22) Filed: Oct. 9, 2020

(65) Prior Publication Data
US 2021/0110514 A1 Apr. 15, 2021

Related U.S. Application Data

(60) Provisional application No. 62/913,884, filed on Oct. 11, 2019.

(51) Int. Cl.
*G06T 3/40* (2006.01)
*G06F 18/25* (2023.01)
(Continued)

(52) U.S. Cl.
CPC .......... *G06T 3/4061* (2013.01); *G06F 18/251* (2023.01); *G06T 3/4007* (2013.01);
(Continued)

(58) Field of Classification Search
CPC ... G06T 3/4069; G06T 3/4007; G06T 3/4076; G06T 3/4053; G06T 3/4061; G06T 3/0056; G06T 3/40; G06K 9/6289
See application file for complete search history.

(56) References Cited

U.S. PATENT DOCUMENTS 7,856,154 B2 * 12/2010 Young .................. G06T 3/4069
382/280
8,009,933 B2 * 8/2011 Tanaka .................. G06T 3/4069
382/299
(Continued)

OTHER PUBLICATIONS

Anger et al., "Fast and Accurate Multi-frame Super-resolution of Satellite Images", ISPRS Annals of the Photogrammetry, Remote Sensing and Spatial Information Sciences, vol. V-1-2020, 2020, pp. 57-64.

(Continued)

*Primary Examiner* — Manav Seth
(74) *Attorney, Agent, or Firm* — Lerner David LLP

(57) ABSTRACT

Methods, devices and non-transitory computer-readable storage medium for processing a sequence of respective top view images of a same terrestrial location are provided. One of the method may comprise choosing one image, called reference image, among the respective top view images, estimating for each respective top view image a respective geometric deformation between the respective top view image and the reference image, computing by the respective geometric deformations respective subpixel positions of the respective top view images relative to one high-resolution coordinate system, interpolating at the respective subpixel positions to sample at least part of at least some of the respective top view images on a prescribed grid to obtain a high-resolution image.

27 Claims, 12 Drawing Sheets

(51) Int. Cl.
*G06V 10/80* (2022.01)
*G06V 10/24* (2022.01)

(52) U.S. Cl.
CPC .......... *G06T 3/4069* (2013.01); *G06T 3/4076* (2013.01); *G06V 10/803* (2022.01); *G06V 10/247* (2022.01)

(56) References Cited

U.S. PATENT DOCUMENTS

| | | | | |
|---|---|---|---|---|
| 8,116,576 | B2* | 2/2012 | Kondo | H04N 19/527 382/284 |
| 9,064,476 | B2* | 6/2015 | Sun | G06T 3/4053 |
| 9,501,683 | B1* | 11/2016 | Hatstat | G06K 7/1465 |
| 11,386,524 | B2* | 7/2022 | Mammou | G06T 9/00 |
| 2005/0019000 | A1* | 1/2005 | Lim | G06T 3/4084 386/209 |
| 2007/0071362 | A1* | 3/2007 | Milanfar | G06T 3/4076 382/299 |
| 2013/0129236 | A1* | 5/2013 | Wedi | G06T 3/4007 382/232 |
| 2022/0207747 | A1* | 6/2022 | Su | G06T 7/90 |
| 2022/0222866 | A1* | 7/2022 | Petrangeli | G06T 9/40 |

OTHER PUBLICATIONS

Briand et al., "Improvements of the Inverse Compositional Algorithm for Parametric Motion Estimation", Published in Image Processing on Line, vol. 8 2018, pp. 435-464.
Briand et al., "Optimization of Image B-spline Interpolation for GPU Architectures", Image Processing on Line, Available Online at <https://hal.archives-ouvertes.fr/hal-02262502>, 2019, 23 pages.
Keren et al., "Image Sequence Enhancement Using Sub-pixel Displacements", Dept. of Computer Science, IEEE, 1988, pp. 742-746.
Ponomarenko et al., "An Automatic Approach to Lossy Compression of AVIRIS Images", IEEE, 2007, pp. 472-475.
Reichenbach et al., "Characterizing Digital Image Acquisition Devices", Optical Engineering, vol. 30, No. 2, Feb. 1991, pp. 170-177.
Roland, Jackson K.M., "A Study of Slanted-Edge MTF Stability and Repeatability", Image Quality and System Performance XII, Jan. 2015, 9 pages.
Strohmer, Thomas, "Computationally Attractive Reconstruction of Bandlimited Images from Irregular Samples", IEEE Transactions on Image Processing, vol. 6, No. 4, Apr. 1997, pp. 540-548.
Strohmer, Thomas, "On Discrete Band-Limited Signal Extrapolation", Contemporary Mathematics, 1995, pp. 1-15.
Takeda et al., "Kernel Regression for Image Processing and Reconstruction", IEEE Transactions on Image Processing, vol. 16, No. 2, Feb. 2007, pp. 349-366.
Tekalp et al., "High-Resolution Image Reconstruction From Lower-Resolution Image Sequences and Space-Varying Image Restoration", IEEE, 1992, pp. III-169-III-172.

* cited by examiner

FIG. 3

S7 : interpolating at the subpixel positions $(\xi_{1,k}, \xi_{2,k})$
to obtain a high-resolution image $u_b$
S71 : spline interpolation

FIG. 4

S7 : interpolating at the subpixel positions $(\xi_{1,k}, \xi_{2,k})$
to obtain a high-resolution image $u_b$
S72 : Fourier interpolation

FIG. 5

S11: calculating respective weights $w_j$ for each respective exposure time $ET_j$ for respective top view images $z_j$

↓

S12: fusing the respective top view images $z_j$ weighted with the respective weights $w_j$

FIG. 7

S31: estimating a respective signal-to-noise ratio $SNR_j$ for each respective top view image $z_j$

↓

S32: calculating respective weights $v_j$ for each signal-to-noise ratio $SNR_j$

↓

S33: fusing the respective top view images $z_j$ weighted with the respective weights $v_j$

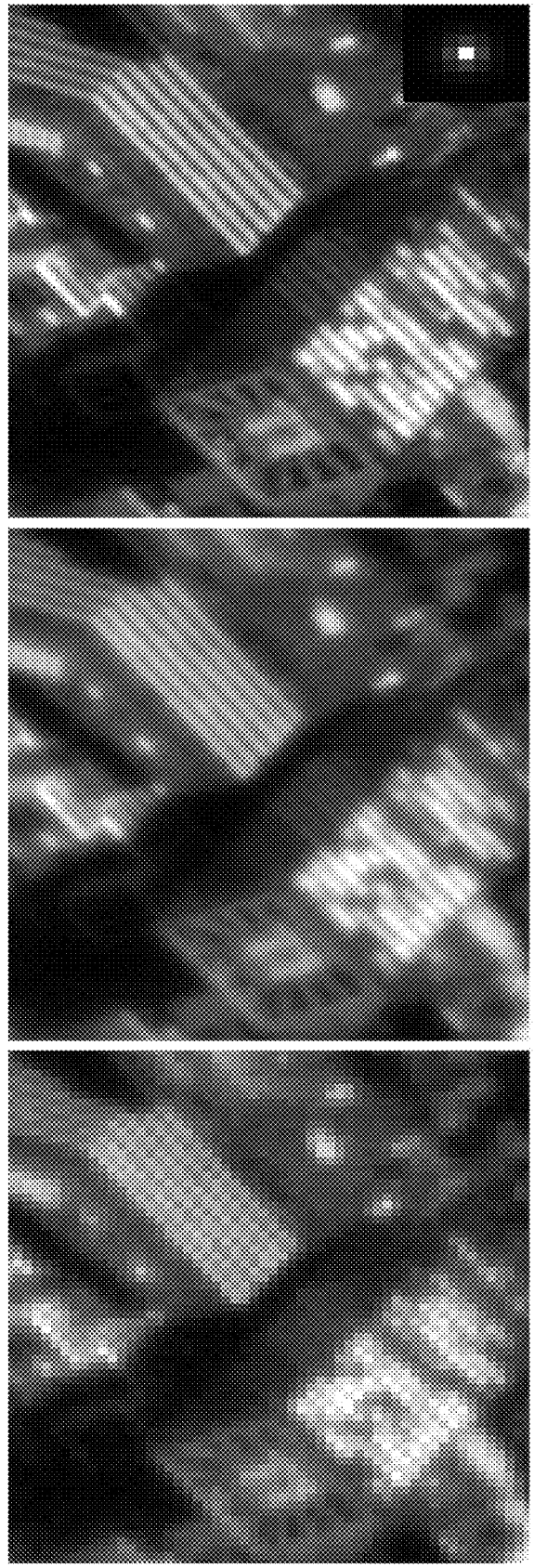

High-resolution synthetic target image IMG-HIGH-RES synthetic low-resolution input image IMG-LOW-RES(input01)

synthetic low-resolution input image IMG-LOW-RES(input07)

synthetic low-resolution input image IMG-LOW-RES(input17)

METHOD, DEVICE AND NON-TRANSITORY COMPUTER-READABLE STORAGE MEDIUM FOR INCREASING THE RESOLUTION AND DYNAMIC RANGE OF A SEQUENCE OF RESPECTIVE TOP VIEW IMAGES OF A SAME TERRESTRIAL LOCATION

CROSS-REFERENCE TO RELATED APPLICATIONS

The present application claims priority of U.S. Provisional patent Application Ser. No. 62/913,884 filed on Oct. 11, 2019, the entire disclosure of which is incorporated herein by reference.

BACKGROUND OF THE INVENTION

The invention concerns a method for processing a sequence of respective top view images of a same terrestrial location.

A field of application of the invention is earth monitoring, for example for the detection of human activity or of any activity.

One goal of the invention is to improve resolution of images taken by satellites or other overhead image acquisition devices.

Especially, the current trend is to launch many small and lowcost satellites, such as the ones named SkySat, which however provide a lower quality of images with higher noise than previous satellites. Especially, these satellites provide a low image resolution.

The fact that the satellite is moving forces a short acquisition time, therefore a low signal to noise ratio. A longer exposition may create blur in the image.

The invention seeks to improve resolution of images which have been acquired by a moving overhead image acquisition device, and to improve their signal to noise ratio.

SUMMARY OF THE INVENTION

The present disclosure relates to a method and system for creating a super-resolved image (e.g., an image obtained by super-resolution processing) of a given scene from several images (e.g. a sequence of images) that each depict the same scene. The image(s) may be obtained from an overhead optical imaging device. In the method, consecutive frames (i.e. images) of a video acquired by an overhead optical imaging device are used as input, and one or more images showing the same content (e.g., the same scene) as the input images are produced with a spatial resolution improved. The number of images output by the method may be equal to or less than the number of input images. The super-resolved image is characterized by a better spatial resolution than each of the (potentially aliased) images acquired directly from the imaging device. Since the images of the sequence are not necessarily registered and there can be movement inside the scene, the super-resolved image is produced according to a reference image from the sequence so as to represent the same scene, with the same point of view, at the same instant. Using a fusion algorithm, the apparent resolution of an image is improved, its dynamic range is increased and its signal to noise ratio (SNR) is also increased. The method may rely on image fusion in a domain transform such as wavelet, Gabor, Fourier, and/or spline. This fusion can be made directly in the image domain or in an adequate basis including, but not limited to, the Fourier domain as described below for the Fourier interpolation, wavelets, splines as described below for the spline interpolation, and Gaborlets.

A first subject matter of the invention is a method for processing a sequence of respective top view images of a same terrestrial location, each respective top view image having pixels and pixel values, comprising the following steps:

choosing one image, called reference image, among the respective top view images, estimating for each respective top view image a respective geometric deformation between the respective top view image and the reference image, computing by the respective geometric deformations respective subpixel positions of the respective top view images relative to one high-resolution coordinate system, interpolating at the respective subpixel positions to sample at least part of at least some of the respective top view images on a prescribed grid to obtain a high-resolution image. A corresponding device and a corresponding non-transitory computer-readable storage medium for processing a sequence of respective top view images of a same terrestrial location are also provided.

A second subject matter of the invention is a method for processing a sequence of respective top view images of a same terrestrial location, each respective top view image having pixels and a respective exposure time, which is not null, wherein at least one first of the respective exposure times, called first exposure time, is higher than at least another one of the respective exposure times, called second exposure time, computing for each respective exposure time a respective weight, wherein the respective weight computed for the first exposure time is higher than the respective weight computed for the second exposure time, fusing the respective top view images into a fused image by linearly and pixel-wise combining the respective top view images weighted with the respective weights. A corresponding device and a corresponding non-transitory computer-readable storage medium for processing a sequence of respective top view images of a same terrestrial location are also provided.

The method may further include an estimate of the useful part of the spectrum in the transform domain. This useful part is potentially estimated by a noise estimation algorithm and by an analysis of the cross-image registration. A third subject matter of the invention is a method for processing a sequence of respective top view images of a same terrestrial location, each respective top view image having pixels being associated to a respective frequency representation, comprising the following steps:

estimating a first spectral support of frequencies of the respective top view images, in which a signal-to-noise ratio of the respective top view images is higher than a signal-to-noise threshold being higher than zero, estimating a second spectral support of the frequencies of the respective top view images, in which an energy of the frequencies of the respective top view images is higher than an energy threshold being higher than zero, intersecting the first spectral support and the second spectral support to obtain a third spectral support of the frequencies of the respective top view images, obtaining from the third spectral support of the frequencies of the respective top view images a spectral support of recoverable frequencies of the respective top view images. A corresponding device and a corresponding non-transitory computer-readable storage medium for processing a sequence of respective top view images of a same terrestrial location are also provided.

A fourth subject matter of the invention is a method for processing a sequence of respective top view images of a same terrestrial location, comprising the following steps:

estimating for each respective top view image a respective signal-to-noise ratio, wherein at least one first of the respective signal-to-noise ratio, called first signal-to-noise ratio, is higher than at least another one of the respective signal-to-noise ratio, called second signal-to-noise ratio, computing for each respective signal-to-noise ratio a respective weight, wherein the respective weight computed for the first first signal-to-noise ratio is higher than the respective weight computed for the second signal-to-noise ratio, fusing the respective top view images into a fused image by linearly and pixel-wise combining the respective top view images weighted with the respective weights. A corresponding device and a corresponding non-transitory computer-readable storage medium for processing a sequence of respective top view images of a same terrestrial location are also provided.

The super-resolution can be done using the whole images or using parts of images to do a local reconstruction.

The methods may be complemented or preceded by a video restoration algorithm, and its application to a series of frames delivering a higher resolution video with enhanced resolution, SNR, and dynamic range. The optical blur of the imaging device complemented by the blur of the fusion method can be estimated on each image and compensated by a deblurring algorithm.

DESCRIPTION OF THE DRAWINGS

The invention will be more clearly understood from the following description, given solely by way of non-limiting example in reference to the appended drawings, in which :

FIG. 3 shows a step of spline interpolation for fusing images in an embodiment of the method, FIG. 4 shows a step of Fourier interpolation for fusing images in an embodiment of the method, FIG. 5 shows steps of a method for processing images, taking into account exposures times according to embodiments of the invention, FIG. 7 shows steps of a method for processing images, taking into account signal-to-noise ratios according to embodiments of the invention.

FIG. 9a shows an example of reference image, which can be used in the method of FIGS. 2, 3 and 4, FIG. 9b illustrates a super-resolved image obtained by the method having spline interpolation of FIG. 3 from the reference image shown in FIG. 9a, FIG. 9c illustrates an example of the sharpening result obtained from the image of FIG. 9b.

FIG. 10a shows a high-resolution and synthetic target image used for testing the method having spline interpolation of FIG. 3, FIGS. 10b, 10c and 10d show 3 synthetic low-resolution input images generated from the high-resolution and synthetic target image of FIG. 10a.

DETAILED DESCRIPTION OF THE INVENTION

Images Taken

The present disclosure relates to a method and system for creating a super-resolved image $u_b$ (e.g., an image obtained by super-resolution processing) of a given scene from one or more images $z_j$ (e.g., a sequence of respective images $z_j$ or frames $z_j$) that each depict the same scene, i.e. the same terrestrial location. The images $z_j$ may be respective top view images $z_j$. In the method, consecutive frames (i.e. consecutive images $z_j$) of a video are used as input, and one or more images $z_j$ showing the same scene as the input images are produced from the input images $z_j$ with a spatial resolution improved. The number of images output by the method may be equal to or less than the number of input images $z_j$. There are for example M images $z_j$, wherein M is an integer higher than 1, for j being an integer going from 1 to M. For example, the same scene, or same terrestrial location in the images $z_j$ may be obtained from a media 201, in which the images are registered, as shown on FIG. 1. The images $z_j$ are obtained by an image production module 200, which may be a computer or any automatic machine, able to download the images from the media 201. The media 201 may be an external media, which may be a database, a distant server, a website, a distant computer or others. The media 201 may be a local media, such as memory or storage media, for example of the image production module 200.

Figure 1:
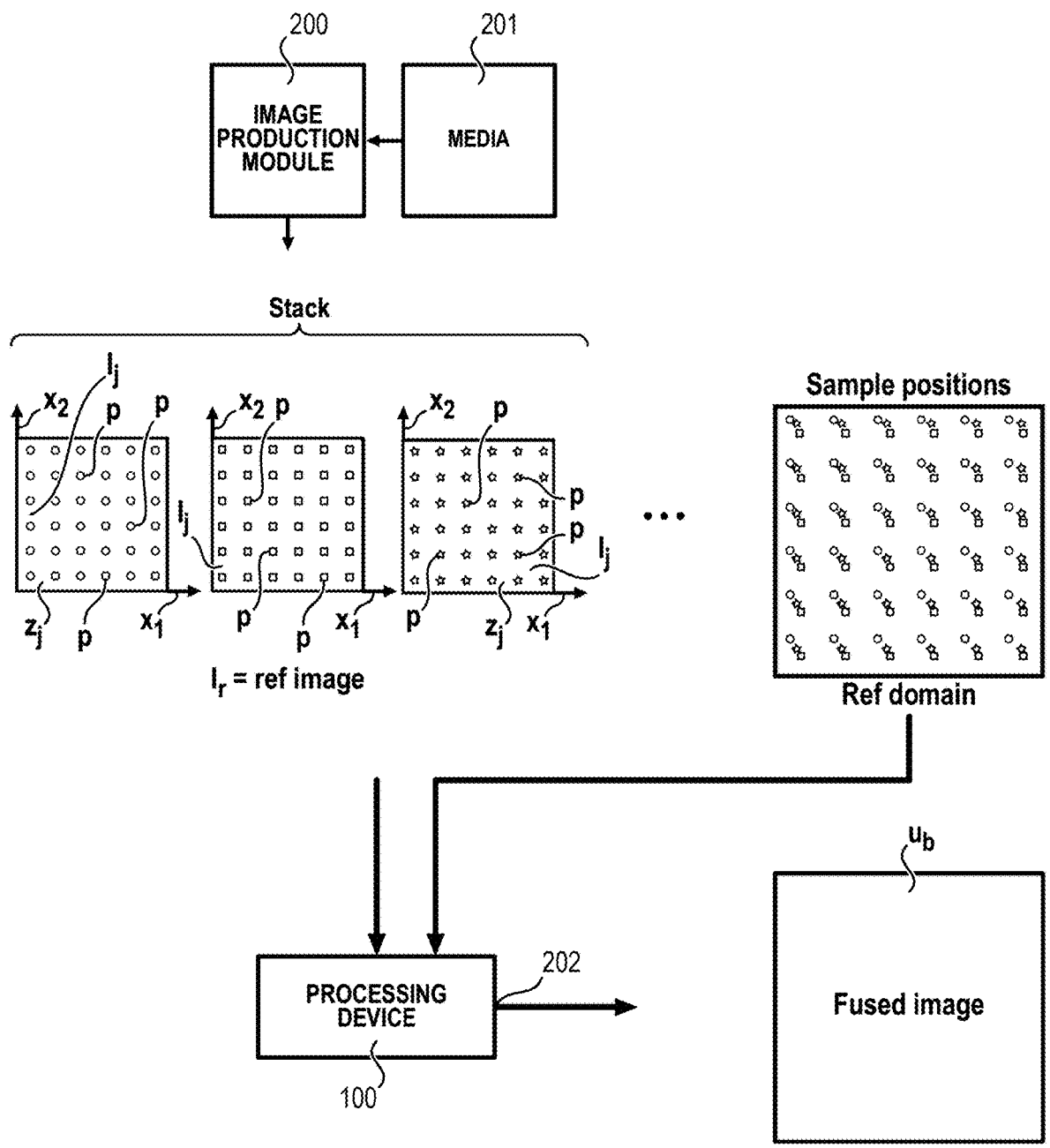
FIG. 1 schematically illustrates an example of a device for processing respective top view images according to an embodiment of the invention.

The respective top view images $z_j$ are images $z_j$ which have been previously acquired from at least one overhead image acquisition device and which may have been stored in the media. The respective top view images $z_j$ may be satellite images $z_j$, or aerial images $z_j$. The image acquisition device may be one or more satellites, using photographic sensors. The respective top view images $z_j$ may also be aerial images $z_j$, taken from a plane or a drone, using photographic sensors. In some embodiments, the image acquisition device acquires a set of respective top view images $z_j$ that depict the same scene. FIG. 1 provides a schematic illustration of a set of images $z_j$ which are identified as a "stack" and which each have pixels p. The method relies on the fusion of the multiple images $z_j$ acquired from the at least one overhead image acquisition device. Such an image acquisition device may obtain images $z_j$ from an elevated position such as a position in space or sky. In some embodiments, the acquisition of the images $z_j$ is obtained from a single image acquisition device, which may be a satellite, a drone, a plane, a dirigible, a balloon, or any other overhead device. The respective top view images $z_j$ acquired possibly may be taken from multiple viewpoints and stored as separate images or as a video. The overhead imaging device may comprise (e.g., embed) an optical system (e.g., an onboard device). The optical system may have a concentrated point spread function and may not apply any anti-aliasing filter. The aliased images $z_j$ inherently possess the information required for the recovery of super-resolved images.

The overhead image acquisition device may be moving relatively to the scene or terrestrial location, as indicated for the examples mentioned above, which create the different viewpoints of the scene or terrestrial location in the images. Furthermore, the different viewpoints can be caused by the motion of the optical system acquiring the images within the overhead image acquisition device. The motion of the optical system within the overhead image acquisition device may be caused by undesirable moving or undesirable wobbling of the optical system acquiring the images or of an actuator of the optical system relatively to the overhead image acquisition device, which can be itself moving or not moving relatively to the scene or terrestrial location. Since the image acquisition cannot be perfectly controlled, neither can the sampling be optimal. Indeed in practice the sampling of the images will rarely be uniform and might follow specific patterns induced by the movement of the imaging platform and instrument, as shown for example in FIG. 8. Since the overhead image acquisition device is moving while acquiring the respective top view images $z_j$, small exposure times may be necessary to avoid blur, thus the images are noisy.

The images $z_j$ can be acquired with different modalities and with any visible or infrared wavelength (visible, VNIR, NIR, SWIR, etc.). In one implementation, the acquisition time may vary from one image $z_j$ to the next. This mechanism allows for the reconstruction of high dynamic range images. The acquisition process can also be controlled so as to improve the sampling geometry which is used for the spectral support estimation as well as the super-resolution.

The method may comprise registering the respective top view images $z_j$, which collectively form a set of images.

In the description below, the images are called respective top view images $z_j$ or $I_j$ or z or u.

Embodiments of the invention are described below, in reference to FIGS. 1 and 2.

Examples of steps of the method(s) for processing the respective top view images $z_j$ are described below in reference to FIGS. 2 to 5. A processing device 100 for processing the respective top view images $z_j$ to carry out the method(s) is also provided, as shown on FIG. 1. The device 100, module 200 and method(s) may be embodied by any means, such as for example computers, calculators, processors, microprocessors, permanent memories, servers, databases, computer programs, man-machine interfaces, user interfaces. The device 100 may comprise means to carry out the steps and operations mentioned of the method(s) of the invention, with these means which can be computers, calculators, processors, microprocessors, graphics processing units (GPU), permanent memories, servers, databases, computer programs, man-machine interfaces, user interfaces. Computer programs according to the invention may comprise instructions for executing the steps and operations of the method(s). The computer program may be recorded on any storage media, which may be permanent storage memory, i.e. a non-transitory computer-readable storage medium, or a non-permanent storage memory.

Image Filtering

Figure 2:
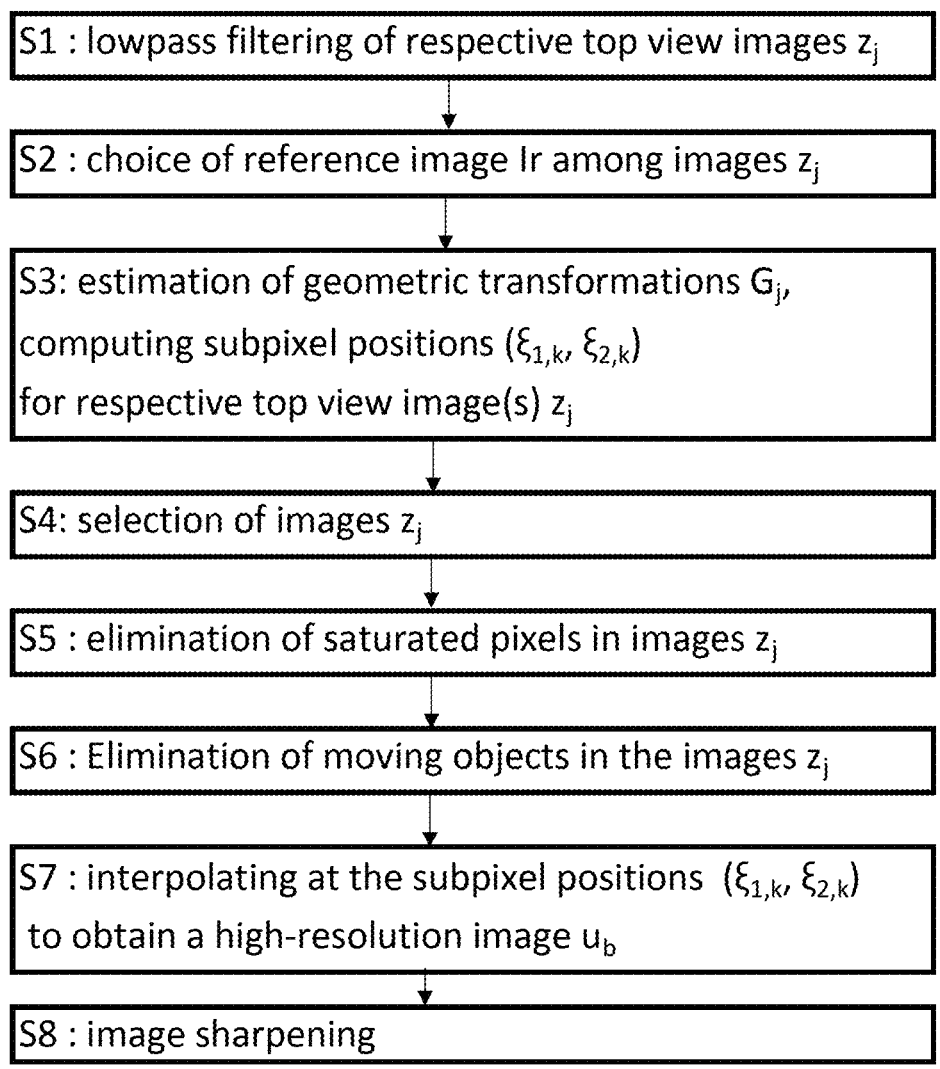
FIG. 2 shows steps of a method for processing images according to embodiments of the invention.

In an embodiment, the images $z_j$ may be filtered by a lowpass antialiasing filter in a step S1, as shown on FIG. 2. The filter may be Gaussian. The filtered respective top view images $z_j$ or $I_j$ are used for the step S3 of estimation of geometric transformation described below. The respective top view images $z_j$ or $I_j$ taken for the steps other than the step S3 and described below, especially the respective top view images $z_j$ or $I_j$ taken for the step S7 of interpolating, are the original respective top view images images $z_j$ or $I_j$, i.e. the respective top view images images $z_j$ or $I_j$ not filtered by the filter of step S1.

Reference Image

In a second step S2, one image, called reference image $I_r$, is chosen among the sequence of the respective top view images $z_j$ of the same scene. The reference image $I_r$ may be any one of the respective top view images $z_j$ in the sequence, for example the reference image $I_r$ appearing the first, or the last or between the first and the last in the sequence.

Estimation of Geometric Transformations of the Images

The fact that the overhead image acquisition device is moving relative to the scene causes a change of viewpoint from each respective image $z_j$ to the next in the sequence relatively to the scene. The movement between the successive respective images $z_j$ and each change of viewpoint of the same scene in the successive respective images $z_j$ can be modelled as a geometric transformation $G_j$. This geometric transformation $G_j$ is estimated using the respective images $z_j$. For remote sensing imagery provided by the overhead image acquisition device, it is particularly useful to consider a specific subclass of geometric transformations $G_j$ that are parametric. A parametric registration of the geometric transformations $G_j$ provides a subpixel registration for each image. Registration between images $z_j$ can be achieved by estimating the parameters associated to the parametric geometric transformations $G_j$.

In a third step S3, a respective geometric transformation $G_j$ from each respective top view image $z_j$ to the reference image $I_r$ is estimated. One geometric transformation $G_j$ is estimated per image $z_j$. The parameters of the respective geometric transformation $G_j$ are estimated and registered for each respective image $z_j$ relatively to the reference image $I_r$. Using the parametrization allows for a more robust and precise alignment than using an optical flow since only a number of parameters lower than two per pixel of a dense flow are estimated.

The step S3 is a registration step. The registration step S3 estimates a subpixel accurate deformation (geometric transformation) between the respective top view images $z_j$.

In an embodiment, each respective geometric transformation $G_j$ is a respective homography $H_j$, which may be a planar homography $H_j$.

In an embodiment, each respective geometric transformation $G_j$ is a respective affinity A.

In an embodiment, each respective geometric deformation $G_j$ comprises a respective affinity $A_j$ and a respective translation field $d_j.T$. The respective translation field $d_j.T$ accounts for potential parallax due to elevation variation in the scene for example. In an embodiment, T is an estimated translation vector field per pixel and is estimated as being the same for all the respective images $z_j$. The translation vector field T may be different from one pixel to the others. There is one translation per pixel, common to all the respective images $z_j$. Consequently, there may be one different translation per pixel in the translation vector field T. In an embodiment, $d_j$ is a scalar estimated for each respective image $z_j$.

Step S3 comprises computing the subpixel positions ($\xi_{1,k}$, $\xi_{2,k}$) of the respective top view images $z_j$ relative to one high-resolution coordinate system by the respective geometric transformation $G_j$ or respective homography $H_j$ or respective affinity $A_j$ and/or respective translation field $d_j.T$ gives subpixel positions ($\xi_{1,k}$, $\xi_{2,k}$) of each respective image $z_j$.

Each respective geometric transformation $G_j$ or respective homography $H_j$ or respective affinity $A_j$ and/or respective translation field $d_j.T$ gives subpixel positions ($\xi_{1,k}$, $\xi_{2,k}$) of each respective image $z_j$. When each respective image $z_j$ is transformed by the respective geometric transformation $G_j$ or respective homography $H_j$ or respective affinity $A_j$ and/or respective translation field $d_j.T$ into a respective transformed image $G_j(z_j)$ or $H_j(z_j)$ or $A_j(z_j)$ and/or $A_j(z_j)+d_j.T(z_j)$, the transformed image $G_j(z_j)$ or $H_j(z_j)$ or $A_j(z_j)$ and/or $A_j(z_j)+d_j.T(z_j)$ gives subpixel positions $(\xi_{1,k}, \xi_{2,k})$ relatively to the pixel positions of the reference image $I_r$ and/or relatively to a high-resolution coordinate system being the same for all the respective images $I_j$ and/or relatively to a high-resolution coordinate system at least for the reference image $I_r$. The high-resolution coordinate system may have a first axis X and a second axis Y perpendicular to the first axis X. The high-resolution coordinate system may be the same for all the respective transformed image $G_j(z_j)$ or $H_j(z_j)$ or $A_j(z_j)$ and/or $A_j(z_j)+d_j.T(z_j)$ and for the high-resolution image $u_b$ obtained from the respective images $I_j$. The parameters of each respective geometric transformation $G_j$ or respective homography $H_j$ or respective affinity $A_j$ and/or respective translation field $d_j.T$ are estimated and registered and enable to reconstruct respective estimations of the respective image $z_j$ from the reference image $I_r$ by reversely transforming the reference image $I_r$ by transformations being the reversal of each respective geometric transformation $G_j$ or respective homography $H_j$ or respective affinity $A_j$ and/or respective translation field $d_j.T$. There are for example M-1 respective geometric transformations $G_j$ or respective homographies $H_j$ or respective affinities $A_j$ and/or respective translation fields $d_j.T$, which are calculated for M-1 respective images $z_j$, with a further respective geometric transformation $G_j$ or respective homography $H_j$ or respective affinity $A_j$ and/or respective translation field $d_j.T$, which is equal to identity for the reference image $I_r$. In an embodiment, only the pixels of the reference image $I_r$ and the parameters of the respective geometric transformations $G_j$ or respective homographies $H_j$ or respective affinities $A_j$ and/or respective translation fields $d_j.T$ are calculated and registered.

$x_1$ is a first coordinate (for example abscissa) of the pixels of the respective images $z_j$ along the first axis X.

$x_2$ is a second coordinate (for example ordinate) of the pixels of the respective images $z_j$ along the second axis Y perpendicular to the first axis X. Denoting k the index of the pixel coordinates $(x_1, x_2)$ of the respective images $z_j$ (also called pixel positions $(x_1, x_2)$ of the respective images $z_j$), we have :

$(x'_1, x'_2)=G_j(x_1, x_2)$ or $H_j(x_1, x_2)$ or $A_j(x_1, x_2)$ and/or $A_j(x_1, x_2)+d_j.T(x_1, x_2)$ being the subpixel positions $(\xi_{1,k}, \xi_{2,k})$ of each respective image $z_j$ being transformed by the respective geometric transformation $G_j$ or respective homography $H_j$ or respective affinity $A_j$ and/or respective translation field $d_j.T$, $x'_1=\xi_{1,k}=G_j(x_1, x_2)_1$ or $H_j(x_1, x_2)_1$ or $A_j(x_1, x_2)_1$ and/or $A_j(x_1, x_2)_1+d_j.T(x_1, x_2)_2$ is the first coordinate of the subpixel positions $(\xi_{1,k}, \xi_{2,k})$ of the respective transformed image $G_j(z_j)$ or $H_j(z_j)$ or $A_j(z_j)$ and/or $A_j(z_j)+d_j.T(z_j)$, along the first axis, calculated by transforming the respective pixel positions $(x_1, x_2)$ of the respective images $z_j$ by the respective geometric transformation $G_j$ or respective homography $H_j$ or respective affinity $A_j$ and/or respective translation field $d_j.T$, $x'_2=\xi_{2,k}=G_j(x1, x_2)_2$ or $H_j(x_1, x_2)_2$ or $A_j(x_1, x_2)_2$ and/or $A_j(x_1, x_2)_2+d_j.T(x_1, x_2)_2$ is the second coordinate of the subpixel positions $(\xi_{1,k}, \xi_{2,k})$ of the respective transformed image $G_j(z_j)$ or $H_j(z_j)$ or $A_j(z_j)$ and/or $A_j(z_j)+d_j.T(z_j)$, along the second axis, calculated by transforming the respective pixel positions $(x_1, x_2)$ of the respective images $z_j$ by the respective geometric transformation $G_j$ or respective homography $H_j$ or respective affinity $A_j$ and/or respective translation field $d_j.T$.

In case of respective homographies $H_j$, the parameters of the respective homography $H_j$ are uniform for all the pixels of the respective image $z_j$. In an embodiment, eight parameters of the respective homography $H_j$ are calculated for each respective image $z_j$ relatively to the reference image $I_r$, as follows :

$$x'_1 = \frac{H_{j,0}x_1 + H_{j,1}x_2 + H_{j,2}}{H_{j,6}x_1 + H_{j,7}x_2 + 1}$$

$$x'_2 = \frac{H_{j,3}x_1 + H_{j,4}x_2 + H_{j,5}}{H_{j,6}x_1 + H_{j,7}x_2 + 1}$$

In case of respective affinities $A_j$, the parameters of the respective affinity $A_j$ are uniform for all the pixels of the respective image $z_j$. In an embodiment, six parameters of the respective affinity $A_j$ are calculated for each respective image $z_j$ relatively to the reference image $I_r$, as follows:

$$x'_1=A_{j,0}x_1+A_{j,1}x_2+A_{j,2}$$

$$x'_2=A_{j,3}x_1+A_{j,4}x_2+A_{j,5}$$

In case of respective affinities $A_A$ and respective translation fields $d_j.T$ (dense flow T), the parameters of the respective affinity $A_j$ and of the respective translation field $d_j.T$, are uniform for all the pixels of the respective image $z_j$. In an embodiment, six parameters of the respective affinity $A_j$ are calculated, the scalar $d_j$ and the translation field for each respective image $z_j$ relatively to the reference image $I_r$, are calculated as follows:

$$x'_1=A_{j,0}x_1+A_{j,1}x_2+A_{j,2}+d_jT(x_1, x_2)_1$$

$$x'_2=A_{j,3}x_1+A_{j,4}x_2+A_{j,5}+d_jT(x_1, x_2)_2$$

Consequently, the first coordinate $x_1$ of the pixels of the respective images $I_j$ may be multiple of a first pixel pitch $P_1$ (prescribed and known, higher than 0) along the first axis X, whereas due to the respective geometric transformation $G_j$ or respective homography $H_j$ or respective affinity $A_j$ and/or respective translation $d_j.T$ the first coordinate $x'_1$ of the subpixel positions $(\xi_{1,k}, \xi_{2,k})$ of the respective transformed image $G_j(z_j)$ or $H_j(z_j)$ or $A_j(z_j)$ and/or $A_j(z_j)+d_j.T(z_j)$ along the first axis X may not be a multiple of the first pixel pitch $P_1$ and may represent an irregular sampling. The second coordinate $x_2$ of the pixels of the respective images $I_j$ may be multiple of a second pixel pitch $P_2$ (prescribed and known, higher than 0) along the second axis Y, whereas due to the respective geometric transformation $G_j$ or respective homography $H_j$ or respective affinity $A_j$ and/or respective translation field $d_j.T$ the second coordinate $x'_2$ of the subpixel positions $(\xi_{1,k}, \xi_{2,k})$ of the respective transformed image $G_j(z_j)$ or $H_j(z_j)$ or $A_j(z_j)$ and/or $A_j(z_j)+d_j.T(z_j)$ along the second axis Y may not be a multiple of the second pixel pitch $P_2$ and may represent an irregular sampling.

FIG. 1 shows transformed images $G_j(z_j)$ or $H_j(z_j)$ or $A_j(z_j)$ and/or $A_j(z_j)+d_j.T(z_j)$ superposed on the reference image $I_r$ in the high-resolution coordinate system.

In an embodiment, the estimation of each respective geometric transformation $G_j$ or respective homography $H_j$ or respective affinity $A_j$ and/or respective translation field $d_j.T$ can be done by optimizing all parameters of the respective geometric transformation $G_j$ or respective homography $H_j$ or respective affinity $A_j$ and/or respective translation field $d_j.T$ jointly by minimizing the distance between the transformed image $W(I_j, G)$ and the reference image $I_r$, as shown in the equation below, where $I_j$ is the respective top view image, $I_r$ is the reference frame, G is the optimal parametric transformation being the respective geometric transformation $G_j$ or respective homography $H_j$ or respective affinity $A_j$ and/or respective translation field $d_j.T$ for the respective image $I_j$, and $W(I_j, G)$ is the respective image $I_j$ transformed (warped) by the parametric transformation G being the respective geometric transformation $G_j$ or respective homography $H_j$ or respective affinity $A_j$ and/or respective translation field $d_j.T$:

$$G = \arg\operatorname*{argmin}_{G} \; \|(W(I_j, G) - I_r\|$$

When the parametric hypothesis is not valid anymore, for example if it fails in regions where the parallax effect is too important (e.g. buildings), a small correction term can be added to the estimation to correct the registration in regions where it fails. The equation below adds such a correction term R which is the respective translation field $d_j.T$.

$$G = \arg\operatorname*{argmin}_{G} \; \|(W(I_j, G, R) - I_r\|$$

In an embodiment, each respective geometric transformation $G_j$ or respective homography $H_j$ or respective affinity $A_j$ and/or respective translation field $d_j.T$ may be estimated using an inverse compositional algorithm. In an embodiment, the respective geometric transformation $G_j$ or respective homography $H_j$ or respective affinity $A_j$ and/or respective translation field $d_j.T$ can be estimated using an inverse compositional algorithm, in which the bicubic interpolation can be replaced by a a spline interpolator, which may be of order 3. In an embodiment, registration maps as illustrated in FIG. 1 may be estimated using an inverse compositional algorithm. A computer program may generate (e.g., compute, analyze) maps associating pixels from each image $I_j$ of the set of images to the subpixel positions ($\xi_{1,k}$, $\xi_{2,k}$) in the reference image $I_r$ by using the respective geometric transformation $G_j$ or respective homography $H_j$ or respective affinity $A_j$ and/or respective translation field $d_j.T$, which has been estimated. This registration process may be completed for each image $I_j$ of the set, wherein the images $I_j$ may be taken in turn as the reference image $I_r$ identified in FIG. 1. A registered image is shown schematically as the "ref domain" in FIG. 1 shows schematically the transformed images superposed on the reference image $I_r$ as the «ref domain».

Figure 8:
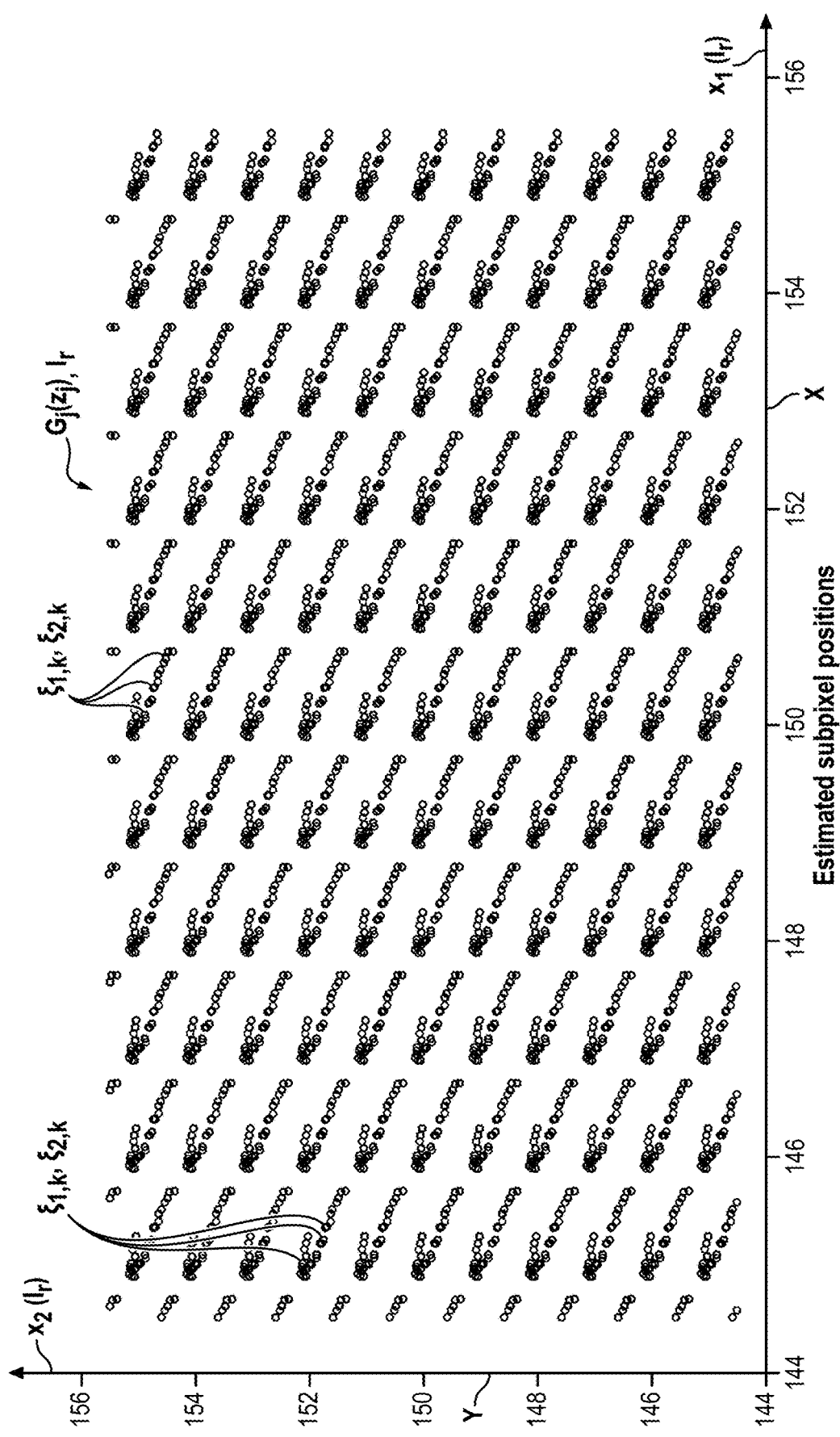
FIG. 8 shows transformed images superposed on a reference image.

FIG. 8 shows an example of the subpixel positions ($\xi_{1,k}$, $\xi_{2,k}$) estimated for respective top view images $z_j$ on the pixel grid of the reference image $I_r$. FIG. 8 shows the transformed images $G_j(z_j)$ superposed on the reference image Ir. The horizontal axis X of FIG. 8 indicates the first coordinates $x_1(I_r)$ of the pixels of the reference image $I_r$ which have a first pixel pitch $P_1=1$. The vertical axis Y of FIG. 8 indicates the second coordinates $x_2(I_r)$ of the pixels of the reference image $I_r$ which have a second pixel pitch $P_2=1$. The fact that the subpixel positions ($\xi_{1,k}$, $\xi_{2,k}$) of FIG. 8 are mostly aligned in each pixel shows that the overhead image acquisition device was moving along a straight line above the terrestrial location during the acquisition of the respective top view images $I_j$.

Selection of Images

According to an embodiment of the invention, in a fourth step S4 it may be estimated whether the respective geometric transformation $G_j$ or respective homography $H_j$ or respective affinity $A_j$ and/or respective translation field $d_j.T$ having been estimated are similar to one another. The respective top view image(s) $I_j$ for which the respective geometric transformation $G_j$ or respective homography $H_j$ or respective affinity $A_j$ and/or respective translation field $d_j.T$ is not similar to the other respective geometric transformation $G_j$ or respective homography $H_j$ or respective affinity $A_j$ and/or respective translation field $d_j.T$ may be eliminated from the respective top view images $I_j$ and may not be used in the other steps. The respective top view image(s) $I_j$, which are not eliminated, are selected are named below the "at least some of the respective top view images" $I_j$. The similarity may be estimated by the fact that the respective top view image $I_j$ has a minimal overlap with the reference image Ir, for example more than 50% or 60% or 70% or 80% overlap. This may reduce errors and instability.

Elimination of Saturated Parts in the Images

The method may further include a local or global image registration algorithm. According to an embodiment of the invention, in a fifth step S5, saturated pixel values in the at least some of the respective top view images $I_j$ are detected and are eliminated therefrom. The respective top view images $I_j$ from which pixel values are eliminated are selected and are called below the at least part of at least some of the respective top view images $I_j$. This detection of saturated pixel values may be done by comparing each pixel value of the respective top view images $I_j$ to a prescribed pixel saturation threshold. A pixel value is detected as being saturated when this pixel value is higher than the prescribed pixel saturation threshold.

Elimination of Moving Objects in the Images

According to an embodiment of the invention, in a sixth step S6, moving objects are detected in the pixel values of the respective top view images $I_j$. The moving object is moving on the terrestrial location of the scene within at least one of the respective top view images $I_j$ and may be for example a car moving on a road or other. Detection of moving objects is employed to ensure the robustness of the method against changes in the scene during the acquisition of the images. This is caused by the sequential acquisition process. Since all images are taken one after another, a moving object in the scene will appear at different positions in the successive images. Taking into account these moving objects before producing the final results avoids causing large artifacts such as ghosting or ringing. Different processes can be used to detect these moving objects. In particular, in one implementation, the error between the reference image Ir and the respective top view images $I_j$ using the estimated registration parameters can be used to create a mask of detected objects in motion. Other techniques such as optical flow divergence or background subtraction can be employed. It is important for this estimation to be automatic and not rely on human intervention. Therefore, a threshold has to be set as a function of the imaging device and the scene so as to work in all conditions.

The method may comprise fixing objects that were previously detected in the motion detection step as described above, in at least one of the respective top view images $I_j$. Moving objects need to be fixed before the super-resolution step S7 so as to avoid contradictory information during the reconstruction. A first possibility is to remove the moving objects from the scene using an inpainting method. The reconstructed output will then depict a scene free of the moving objects, representing the regions as static across all images. However, information about the moving objects is then completely lost even though it can be important for some applications like traffic monitoring. In that case transforming the images to make them consistent with the reference image may be done. This means that the super-resolved image will have the moving objects at exactly the same position they had in the reference image. Again inpainting techniques can be used to transport this information from one image to another.

The pixel values detected as being a moving object in the respective top view images $I_j$ may be replaced by corresponding pixel values of the reference image $I_r$ at the subpixel positions $(\xi_{1,k}, \xi_{2,k})$ closest to the pixel values detected. Apparent motions due to parallax and real motions on the ground are detected and compensated to avoid ghosting effects.

For example, the moving object is detected when $$|z_k - I_r(\xi_{1,k}, \xi_{2,k})| > \tau$$

wherein $\tau$ is a prescribed moving object threshold,
$(\xi_{1,k}, \xi_{2,k})$ are the respective subpixel positions,
$z_k$ is a pixel value of the respective top view images $I_j$ or $z_j$,
$I_r$ is the reference image,
$I_r(\xi_{1,k}, \xi_{2,k})$ are the corresponding pixel values of the reference image at the subpixel positions $(\xi_{1,k}, \xi_{2,k})$.

In another example, the moving object may be detected in a window around each pixel. Absolute differences may be computed by summation over a region (window) around the considered pixel. For example, the moving object is detected when $$\sum_{w_1=-W_1}^{W_1} \sum_{w_2=-W_2}^{W_2} |I_j(x_1+w_1, x_2+w_2) - I_r(G_j(x_1+w_1, x_2+w_2))| > \tau$$

wherein $\tau$ is a prescribed moving object threshold,
$x_1$ is the first coordinate of the pixel along the first axis X of the respective top view image $I_j$ or $z_j$,
$x_2$ is the second coordinate of the pixel along the second axis Y of the respective top view image $I_j$ or $z_j$ perpendicular to the first axis,
$w_1$ is an integer varying from $-W_1$ to $W_1$,
$w_2$ is an integer varying from $-W_2$ to $W_2$,
$W_1$ is a first window dimension along the first axis and around the pixel,
$W_2$ is a second window dimension along the second axis and around the pixel,
$I_j$ are the pixel values of the at least part of at least some of the respective top view images,
$I_r$ is the reference image,
$G_j$ is the respective geometric deformation (or respective geometric transformation $G_j$ or respective homography $H_j$ or respective affinity $A_j$ and/or respective translation field $d_j.T$).

The step S4 and/or the step S5 and/or the step S6 may or may not be carried out. After step S1 and/or step S2 and/or step S3 and/or step S4 and/or step S5 and/or step S6, at least part of at least some of the respective top view images $I_j$ or $z_j$ are obtained and processed according to at least one of the following steps described below.

The respective top view images $I_j$ or $z_j$ may be replaced by the at least parts of the at least some of the respective top view images $I_j$ or $z_j$ in the description below.

Interpolation of Images

According to an embodiment of the invention, in a seventh step S7, the at least parts of at least some of the respective top view images $I_j$ or $z_j$ are interpolated at the respective subpixel positions $(\xi_{1,k}, \xi_{2,k})$. The respective top view images $I_j$ or $z_j$ (or the at least parts of the at least some of the respective top view images $I_j$ or $z_j$) are sampled on a prescribed pixel grid to obtain one high-resolution image $u_b$. The high-resolution image $u_b$ has a resolution higher than the resolution of each of the respective top view images $I_j$ which are called low-resolution images $I_j$. The high-resolution image $u_b$ obtained by the interpolation enables to make a fusion of the respective top view images $I_j$ or $z_j$ (or from the at least parts of the at least some of the respective top view images $I_j$ or $z_j$) and can comprise a calculation taking into account all the pixels values of the respective top view images $I_j$ or $z_j$ (or all the pixels values of the at least parts of the at least some of the respective top view images $I_j$ or $z_j$) and all the respective subpixel positions $(\xi_{1,k}, \xi_{2,k})$ of all the pixels values of the respective top view images $I_j$ or $z_j$ (or all the pixels values of the at least parts of the at least some of the respective top view images $I_j$ or $z_j$). The step S7 is a fusion step. The high-resolution image $u_b$ is shown as the fused image $u_b$ on FIG. 1 and is calculated by the device 100 and is supplied on an output 202 (which can be a display, a transitory or non-transitory computer-readable memory, an output port, a communication port, or others) of the processing device 100.

The prescribed grid may be a regular grid prescribed in the respective top view images $I_j$ or $z_j$, i.e. a set of positions $(x_1, x_2)$ regularly spaced by a first pixel pitch $P_1$ (prescribed and known, higher than 0) along the first axis X and regularly spaced by a second pixel pitch $P_2$ (prescribed and known, higher than 0) on the second axis Y (the first pixel pitch $P_1$ may be or may be not equal to second pixel pitch $P_2$). The prescribed grid may be the pixel positions of the reference image $I_r$.

Below are described a first kind of interpolation of images $I_j$ or $z_j$ of step S7, which is a spline interpolation, and a second kind of interpolation of images $I_j$ or $z_j$ of step S7, which is a Fourier interpolation.

Spline Interpolation

According to an embodiment of the invention, in the seventh step S7, the interpolation comprises a sub-step S71 in which the respective top view images $I_j$ or $z_j$ (which may be or may not be the parts of them mentioned above) are interpolated at the respective subpixel positions $(\xi_{1,k}, \xi_{2,k})$ by a n-th order spline interpolation, as shown on FIG. 3. The spline interpolation can use a bidimensional spline model, i.e. can have the two coordinates mentioned below.

Using the precise information (subpixel accurate deformation (geometric transformation) between the respective top view images $z_j$) of the subpixel positions $(\xi_{1,k}, \xi_{2,k})$ provided by registration step S3, the fusion step S7 produces a high-resolution image $u_b$ using a bidimensional spline model.

According to an embodiment of the invention, the spline interpolation uses a local interpolator, such as B-splines. Examples of such B-splines interpolation are described in the below embodiments.

According to an embodiment of the invention, in the seventh step S7, the interpolation comprises the sub-step S71 in which for each respective top view images $I_j$ or $z_j$ a respective vector c of spline coefficients is estimated. The respective vector c of spline coefficients is calculated in such a manner that the n-th order spline interpolation coincides with the respective top view image $I_j$ or $z_j$ at the respective subpixel positions $(\xi_{1,k}, \xi_{2,k})$ for n being an integer varying between 1 and a prescribed fixed integer N higher than 1.

According to an embodiment of the invention, the n-th order spline interpolation is calculated in sub-step S71 as follows. The n-th order spline interpolation is equal to $$\varphi^{(n)}(x_1, x_2) = \sum_{i_1 \in \mathbb{Z}, i_2 \in \mathbb{Z}} c_{i_1, i_2} \beta^{(n)}(x_1 - i_1) \beta^{(n)}(x_2 - i_2)$$

wherein $x_1$ is the first coordinate along the first axis X in the high-resolution coordinate system, $x_2$ is the second coordinate along the second axis Y perpendicular to the first axis X in the high-resolution coordinate system, $C=(C_{i_1, i_2})$ is the respective vector of spline coefficients for $i_1$, being an integer varying from 1 to $N_1$ and for $i_2$ being an integer varying from 1 to $N_2$, $N_1$ is a first number of spline coefficients in the first axis and is higher than 1, $N_2$ is a second number of spline coefficients in a second axis and is higher than 1, wherein c, $i_1$, $i_2$ are defined such that $\varphi^{(n)}(\xi_{1,k}, \xi_{2,k}) = u(\xi_{1,k}, \xi_{2,k})$, $(\xi_{1,k}, \xi_{2,k})$ are the respective subpixel positions on the first axis X and on the second axis Y, u are the respective top view images $I_j$ or $z_j$ or the at least parts of at least some of the respective top view images $I_j$ or $z_j$, $\beta^{(n)}$ is a function defined as $$\beta^{(0)}(x) = \begin{cases} 1 & \text{when } -1/2 < x < 1/2 \\ 1/2 & \text{when } x = \pm 1/2 \\ 0 & \text{otherwise} \end{cases}$$

$$\beta^{(n+1)} = \beta^{(n)} * \beta^{(0)}.$$

The integer $N_1$ is the prescribed number of pixels of the high-resolution image $u_b$ along the first axis X. Consequently, $N_1 = f \cdot n_1$, where $n_1$ is the number of pixels along the first axis X in each respective top view image $z_j$, and f is a factor of super-resolution, which is prescribed for the high resolution image.

In an embodiment, f>1. In an embodiment, 1<f≤4. In an embodiment, 1.3<<f≤3. In an embodiment, 1.5<f≤3. For example, f=2.

This enables to have smaller and more pixels in the high-resolution image $u_b$ than in each respective top view image $z_j$. Consequently, the high-resolution image $u_b$ has along the first axis X a new first pixel pitch $P'_1$ (length of each pixel along the first axis X, prescribed and known, higher than 0) lower than the first pixel pitch $P_1$ of each respective top view image $z_j$, thus with $P'_1 = P_1/f$.

The integer $N_2$ is the prescribed number of pixels of the high-resolution image $u_b$ along the second axis Y. Consequently, $N_2 = f \cdot n_2$, where $n_2$ is the number of pixels along the second axis Y in each respective top view image $z_j$, and f is the factor of super-resolution. This enables to have smaller and more pixels in the high-resolution image $u_b$ than in each respective top view image $z_j$. Consequently, the high-resolution image $u_b$ has along the second axis Y a new second pixel pitch $P'_2$ (length of each pixel along the second axis Y, prescribed and known, higher than 0) lower than the second pixel pitch $P_2$ of each respective top view image $z_j$, thus with $P'_2 = P_2/f$.

According to an embodiment of the invention, the respective vector c of spline coefficients is calculated in sub-step S71 as follows. The respective vector c of spline coefficients is calculated by finding the minimization of the following optimization equation:

$$\arg\min_c \|z - Bc\|_2^2,$$

wherein z is a vector of all the respective top view images $I_j$ or $z_j$ or of all the at least parts of at least some of the respective top view images $I_j$ or $z_j$.

z has P lines, wherein P is an integer higher than 1.

z is a vector storing all the pixel values of all the respective top view images $I_j$ or $z_j$ or of all the at least parts of at least some of the respective top view images $I_j$ or $z_j$.

z is a vector having one column and P lines, which has in each line a pixel value of all the respective top view images $I_j$ or $z_j$ or of all the at least parts of at least some of the respective top view images $I_j$ or $z_j$ per line.

For the vector z and for the respective subpixel positions $(\xi_{1,k}, \xi_{2,k})$ is an integer being the indicia of the lines of the vector z and is an indicia of the pixels values of the respective top view images $I_j$ or $z_j$ or of the parts of at least some of the respective top view images $I_j$ or $z_j$. For the vector z and for the respective subpixel positions $(\xi_{1,k}, \xi_{2,k})$ goes from 1 to M (or less of eliminated images)*(number of pixels per respective top view images $I_j$ or $z_j$ or of per parts of at least some of the respective top view images $I_j$ or $z_j$). * indicates multiplication. B is a matrix having P lines and $N_1 * N_2$ columns, whose matrix coefficients are equal to $$(\beta^{(n)}(\xi_{1,k} - i_1) \beta^{(n)}(\xi_{2,k} - i_2))_{k, (i_1, i_2)}.$$

According to an embodiment of the invention, the respective vector c of spline coefficients is calculated in sub-step S71 as follows. The respective vector c of spline coefficients is calculated by using conjugate gradient to find c such that $B^T B c = B^T z$, wherein $B^T$ is the transpose of B.

As a comparison, in another method, the Adaptive weights Conjugate gradient Toeplitz method (ACT method) is employed to reconstruct the super-resolved image. Accordingly, fusing the registered images may include using the ACT method on an estimated spectral support. The ACT method uses trigonometric polynomials, which are global interpolators. Since the respective top view images $I_j$ can contain outliers with respect to the assumed model, the non-locality of the ACT method implies that errors will propagate spatially everywhere through the result. Moving objects, misregistrations and invalid boundaries conditions are examples of such outliers. The ACT method shows artifacts around edges which are mitigated when using spline interpolation. Furthermore, due to the global nature of trigonometric polynomials of the ACT method, the computational cost of the ACT method makes it unattractive for processing large images. Instead of the ACT method, the spline interpolation of the above-described method uses a more local interpolator, such as B-splines as described above, which mitigates the above-mentioned drawbacks of the ACT method.

Since the matrix B is sparse, its application is much more efficient than its Fourier counterpart. Since the spline interpolation is local, it can be implemented efficiently in GPU. Using a fast parallel spline implementation enables to fuse large images within few seconds, compared to minutes for the ACT method. A number of 20 iterations of conjugate gradient may be a good compromise between reconstruction quality and running time. The prescribed fixed integer N being the maximal order N of spline interpolation may be higher than 5 and lower than 20. High order spline interpolations act as effective regularizers. The maximal order N of spline interpolation may be for example equal to 9.

FIG. 9b illustrates a super-resolved image $u_b$ obtained by the spline interpolation, obtained from the reference image $I_r$ shown in FIG. 9a. A super-resolved image is computed by fusing the acquired images using the registration parameters and the constraints on the estimated spectral support. Fusing the images provides both an increase of spatial resolution and of signal-to-noise ratio.

Figure 10A:
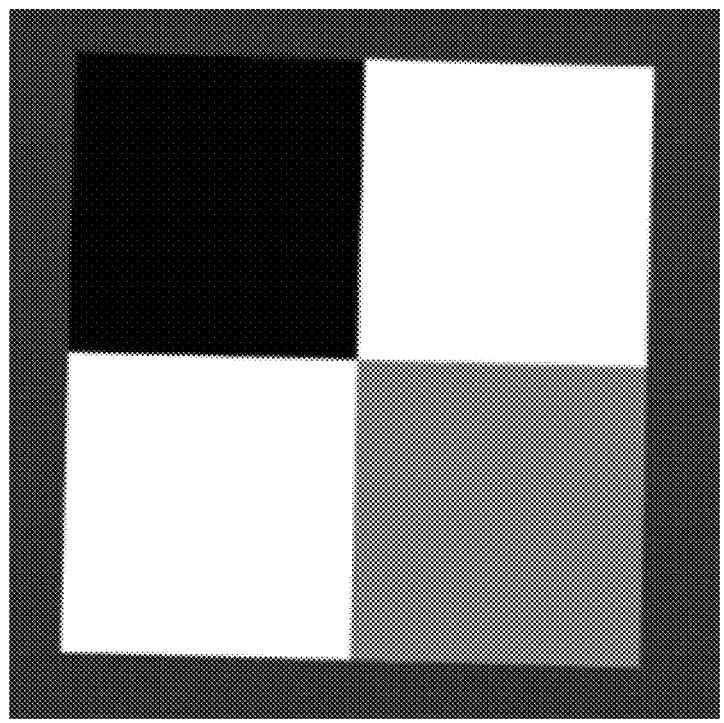
Figure 10B:
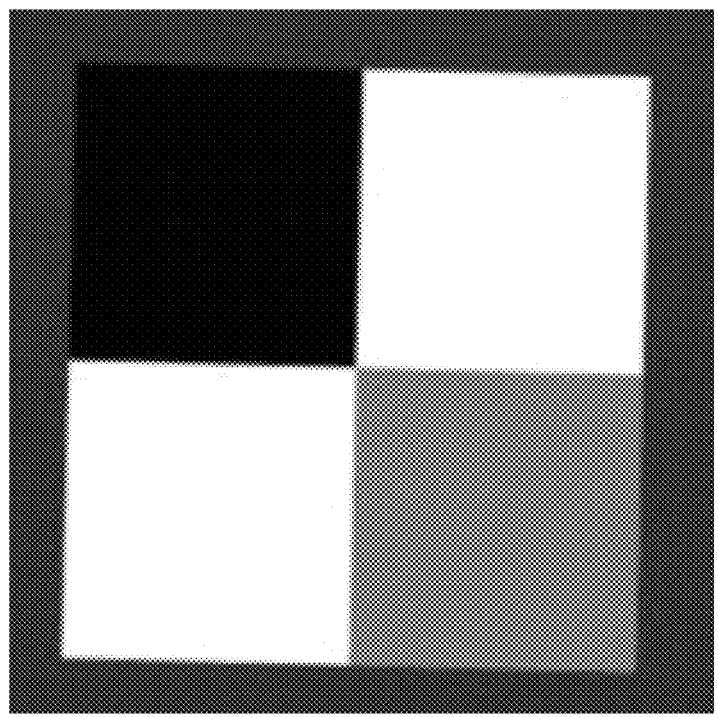
Figure 10C:
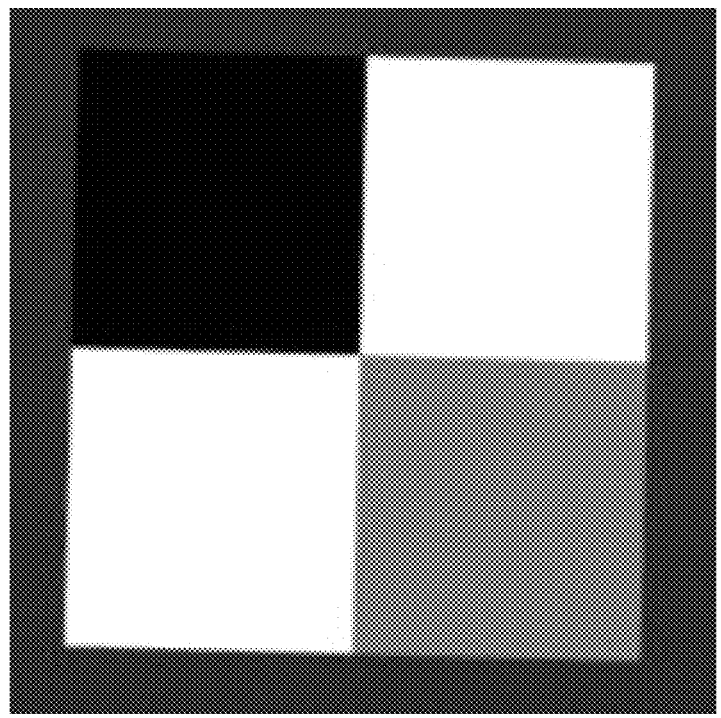
Figure 10D:
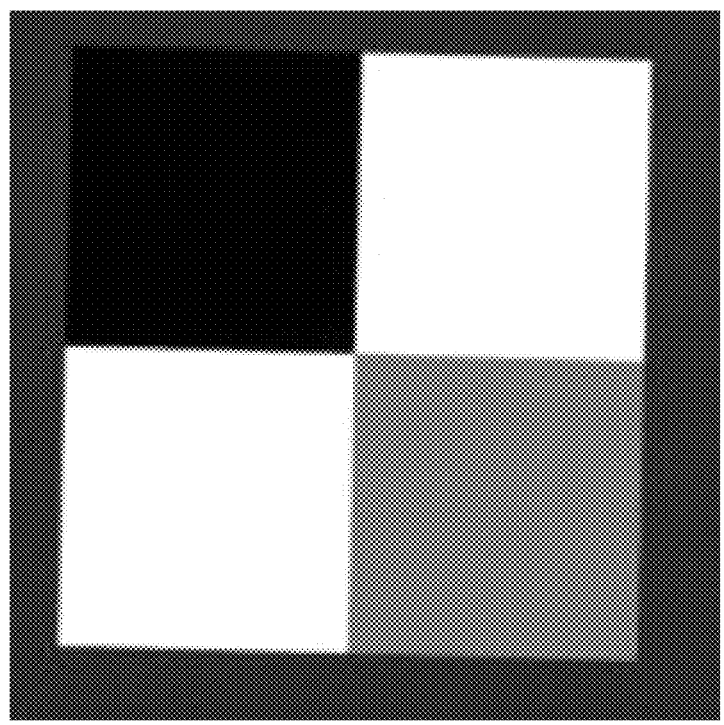

The results of a high-resolution image $u_b$ obtained by the above method using registration step S3 and fusion of step S7 by spline interpolation (without sharpening) were estimated on a set of synthetic input images generated from a slanted-edge target and playing the role of the respective top view images $I_j$. A high-resolution and synthetic target image IMG-HIGH-RES showing a slanted-edge target of FIG. 10a was generated. The set of 18 synthetic low-resolution input images IMG-LOW-RES were generated from the high-resolution and synthetic target image IMG-HIGH-RES of FIG. 10a by degrading the latter by random translations different from each other, subsampling by a factor two with pixel integration and adding Gaussian noise of standard deviation 2/255. FIGS. 10b, 10c and 10d show 3 of the synthetic low-resolution input images IMG-LOW-RES (input01, input07, input17). The synthetic low-resolution input images IMG-LOW-RES were different from each other.

The slanted-edge method for estimation of a Modulation Transfer Function (MTF) was proposed by Reichenbach, S. E. park, S. K., Narayanswarmy, R., 1991, "Characterizing digital image acquisition devices", Optical Engineering, 30(2), 170-178, standardized as ISO 12233 (ISO, 2014) and later improved by Roland, J. K. M., 2015, "A study of slanted-edge MTF stability and repeatability", Image Quality and System Performance XII, 9396, SPIE, 181-189. This results in a denoised high-resolution one-dimensional profile of the edge. The derivative of the edge yields the line-spread function, which in turn is used to compute the MTF by taking the modulus of its discrete Fourier Transform. This allows to assess the per-frequency contrast reduction of the system assuming a radial symmetry of the MTF and without taking noise into account.

Figure 11:
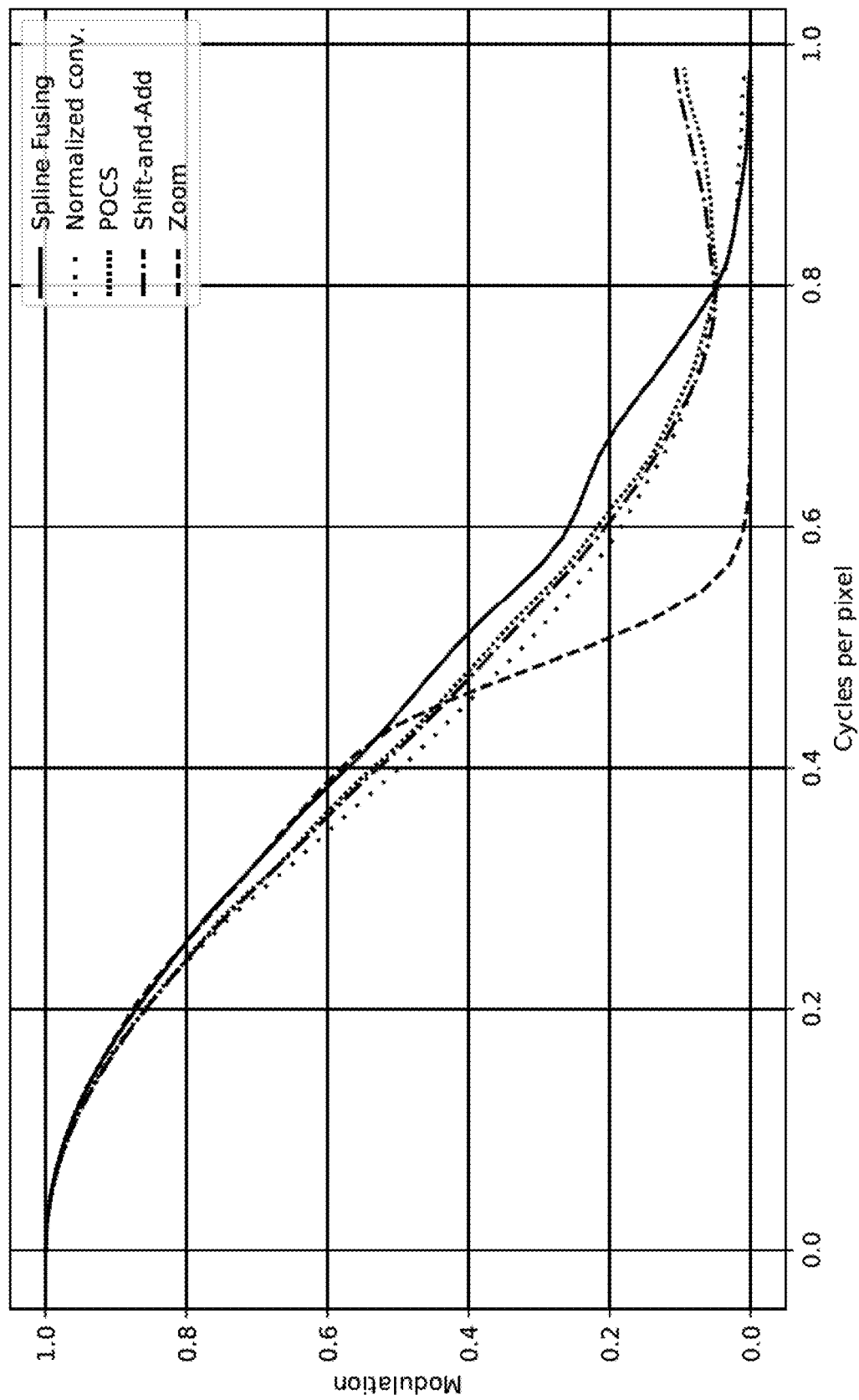
FIG. 11 shows curves of a Modulation Transfer Function measured on an output image resulting from the method having spline interpolation of FIG. 3 carried out on the input images of FIGS. 10b, 10c and 10d.

FIG. 11 shows the MTF (curve indicated as "Spline Fusing" in FIG. 11) calculated on an output image resulting from the above method using registration step S3 and fusion of step S7 by spline interpolation according to the invention on the set of 18 synthetic low-resolution input images IMG-LOW-RES, compared to the MTF calculated on the output image resulting from other known methods of processing which were used on the same set of 18 synthetic low-resolution input images IMG-LOW-RES:

the MTF (curve indicated as "Zoom" in FIG. 11) calculated on the output image resulting from a zoom method using splines of order 9 with the implementation of Briand, T., Davy, A., 2019, "Optimization of Image B-Spline Interpolation for GPU Architectures", IPOL, 9, 183-204, the MTF (curve indicated as "Shift-and-Add" in FIG. 11) calculated on the output image resulting from a Shift-and-Add method with the implementation of Keren, D., Peleg, S., Brada, R., 1988, "Image sequence enhancement using sub-pixel displacements", CVPR 88, 742-743, the MTF (curve indicated as "POCS" in FIG. 11) calculated on the output image resulting from a method of projection onto convex set with the implementation of Tekalp, A. M., Ozkan, M. K., Sezan, M. I., 1992, "High-resolution image reconstruction from lower-resolution image sequences and space-varying image restoration", ICASSP, 3, 169-172, the MTF (curve indicated as "Normalized Conv." in FIG. 11) calculated on the output image resulting from a method of normalized convolution with the implementation of Takeda, H., Farsiu, S., Milanfar, P., 2007, "Kernel regression for image processing and reconstruction", IEEE Transactions on image processing and reconstruction, 16(2), 349-366.

In FIG. 11, the abscissas of the curves are the number of cycles per pixel of the output image, which is proportional to the spatial frequency of the pixels in the frequency domain of Fourier. A low number of cycles per pixel means slow oscillations of the pixel, while a high number of cycles per pixel means rapid oscillations of the pixel. In FIG. 11, the ordinates of the curves are the modulation in the Fourier domain. The higher the modulation, the less the frequency corresponding to the number of cycles per pixel is attenuated. FIG. 11 shows that the method according to the invention ("Spline Fusing") provides a higher MTF of the output image than the known methods, which means that the method according to the invention recovers more information in high frequencies. The high frequency bounce (between 0.8 and 1.0 of the number of cycles) observed in the MTFs of POCS and shift-and-add in FIG. 11 are caused by the artifacts and their reconstructions.

Fourier Interpolation

According to an embodiment of the invention, in the seventh step S7, the interpolation comprises a sub-step S72 in which the respective top view images $I_j$ or $z_j$ (which may be or may not be the parts of them mentioned above) are interpolated at the respective subpixel positions ($\xi_{1,k}$, $\xi_{2,k}$) by a Fourier interpolation, as shown on FIG. 4, to create the high-resolution image $u_b$.

According to an embodiment of the invention, in the sub-step S72, the Fourier interpolation F is calculated as follows. The Fourier interpolation F equal to $$F(x_1, x_2) = \mathcal{F}(x_1, x_2) = \sum_{\omega_1, \omega_2} v_{\omega_1, \omega_2} e^{-2\pi i (x_1 \omega_1 + x_2 \omega_2)}$$

wherein $x_1$ is the first coordinate along the first axis X in the high-resolution coordinate system, $x_2$ is the second coordinate along the second axis Y perpendicular to the first axis X in the high-resolution coordinate system.

$F(x_1, x_2)$ is the bi-dimensional Fourier spectrum corresponding to the pixel coordinates $(x_1, x_2)$ of the respective images $z_j$.

$v = v_{\omega_1, \omega_2}$ is a Fourier spectrum value at a bidimensional pulsation $(\omega_1, \omega_2)$, $\omega_1$ is a first pulsation in a frequency domain of the Fourier spectrum and corresponds to the first axis X of the high-resolution image $u_b$, $\omega_2$ is a second pulsation in a frequency domain of the Fourier spectrum and corresponds to the second axis Y of the high-resolution image $u_b$, perpendicular to the first axis X.

It is known that the pulsation is equal to the frequency multiplied by $2\pi$ in the frequency domain.

According to an embodiment of the invention, in the sub-step S72, the Fourier interpolation F is calculated as follows. The Fourier spectrum values $v=v_{\omega_1,\omega_2}$ are calculated by finding the minimization of the following optimization equation:

$$\arg\min_{v} \|z - Fv\|_2^2$$

wherein z is the vector of the pixel values of the at least part of at least some of the respective top view images and has P lines, as mentioned above.

F is a matrix, whose matrix coefficients are equal to $$(e^{-2\pi i(\xi_{1,k}\omega_1 + \xi_{2,k}\omega_2)})_{k,(\omega_1,\omega_2)}$$

wherein $(\xi_{1,k}, \xi_{2,k})$ are the respective subpixel positions on the first axis X and on the second axis Y.

Deblurring and Image Sharpening

According to an embodiment of the invention, the high-resolution image $u_b$ obtained in step S7 can be deblurred in an eighth step S8 of image sharpening by a spectral filtering, as described below, in post-processing. Image sharpening is employed to reduce the blur of the super-resolved image after fusion. Deconvolution may also provide a means to extend the spectrum of the super-resolved image outside the estimated spectral support.

According to an embodiment of the invention, in the eighth step S8, a blur kernel k' is defined. The blur kernel k' has a spectrum whose attenuation in a frequency domain is equal to a first component being a radial contrast attenuation and multiplied by at least a second component being modeled as a transition in the frequency domain between an integration filter of the pixels of the high-resolution image $u_b$ which have a dimension equal to 1/f and a filter corresponding to pixels of dimension 1, wherein f is a prescribed factor of super-resolution of the high resolution image and is higher than 1.

The high-resolution image $u_b$ is deconvolved by dividing a spectrum of the high-resolution image $u_b$ by the spectrum of the blur kernel k' to obtain a processed image.

According to an embodiment of the invention, the first component being a radial contrast attenuation is a low-pass frequency function.

According to an embodiment of the invention, wherein the low-pass frequency function is $C(|\omega|)=(a|\omega|+1)^{-1}$, wherein a is prescribed fixed value, $\omega$ is a pulsation equal to $\sqrt{(\omega_x^2+\omega_y^2)}$ wherein $\omega_x$ is a first pulsation in the frequency domain and corresponds to the first axis X of the high-resolution image $u_b$, wherein $\omega_y$ is a second pulsation in the frequency domain and corresponds to the second axis of the high-resolution image $u_b$, perpendicular to the first axis X.

According to an embodiment of the invention, the second component is equal to $S(\omega_x, \omega_y) = \text{sinc}(f.\omega_x).\text{sinc}(f.\omega_y).(\text{sinc}(\omega_x).\text{sinc}(\omega_y))^{-1}$.

The definition of $\text{sinc}(f.\omega_x)$ is: $\text{sinc}(f.\omega_x)=\sin(\pi.f.\omega_x)/(\pi.f.\omega_x)$.

The definition of $\text{sinc}(f.\omega_y)$ is: $\text{sinc}(f.\omega_y)=\sin(\pi.f.\omega_y)/(\pi.f.\omega_y)$.

The definition of $\text{sinc}(\omega_x)$ is: $\text{sinc}(f.\omega_x)=\sin(\pi\omega_x)/(\pi.\omega_x)$.

The definition of $\text{sinc}(\omega_y)$ is: $\text{sinc}(f.\omega_y)=\sin(\pi.\omega_y)/(\pi.\omega_y)$.

According to an embodiment of the invention, the attenuation of the spectrum of the blur kernel k' in the frequency domain is the first component multiplied by the second component and further multiplied by a third component being a point spread function of the respective top view images.

According to an embodiment of the invention, the deconvolving comprises finding as processed image an image $u_s$ which is the minimization of the following optimization equation:

$$\arg\min_{u_s} \|u_s * k' - u_b\|_2^2 + \lambda_1 \|\nabla u_s\|_1 + \lambda_2 \|\nabla u_s\|_2^2$$

wherein k' is the blur kernel, $u_b$ is the high-resolution image, $\lambda_1$ is a first fixed predetermined coefficient, $\lambda_2$ is a second fixed predetermined coefficient, $\|\nabla u_s\|_1$ is a L1 norm of a gradient of the processed image $u_s$, $\|\nabla u_s\|_2^2$ is a squared L2 norm of a gradient of the processed image $u_s$.

In an embodiment, the total variation prior ($\|\nabla u_s\|_1$, L1 norm of a gradient of the processed image $u_s$) can be replaced with the L1 norm of any image $I_j$. This can be more adapted to restore overhead images $I_j$. Depending on the characteristics of the overhead image acquiring device and fusion parameters, the blur kernel can be adjusted. An example of the sharpening result is shown in FIG. 9c. For example, $\lambda_1=0.4$ and $\lambda_2=0.01$. The image after the sharpening step S8 is less noisy and more contrasted as a result of the inversion of the blur and the regularization.

In an embodiment, a kernel regression may be utilized followed by a deblurring adapted to the repartition of fused samples.

The processed image is calculated by the device 100 and is supplied on the output 202 (which can be a display, a transitory or non-transitory computer-readable memory, an output port, a communication port, or others) of the processing device 100.

Image Exposure Time

According to an embodiment of the invention, a second method for processing a sequence of respective top view images $I_j$ of a same terrestrial location, taking into account exposure times different of each other of the respective top view images $I_j$ is provided, as shown on FIG. 5. This second method may be combined or not with the method described above. The method may comprise an exposure time fusion step. The respective top view images Ij may have different exposure times, for example coming from a bracketed acquisition, so as to capture all the dynamic of a scene.

According to the second method, each respective top view image $I_j$ has pixels and a respective exposure time $ET_j$, which is not null.

At least two of the respective exposure time $ET_j$ are different from one another. For example, one (or more) first of the respective exposure times, called first exposure time $ET_{j1}$, is higher than one (or more) other of the respective exposure times, called second exposure time $ET_{j2}$.

In a step S11, a respective weight $w_j$ is calculated for each respective exposure time $ET_j$. The respective weight $w_{j1}$ calculated for the first exposure time $ET_{j1}$ is higher than the respective weight $w_{j2}$ calculated for the second exposure time $ET_{j2}$, i.e. $w_{j2}>w_{j1}$ for $ET_{j1}>ET_{j2}$.

In a step S12, the respective top view images $I_j$ are fused into a fused image by linearly and pixel-wise combining the respective top view images $I_j$ weighted with the respective weights $w_j$. This fused image is calculated by the device 100 and is supplied on the output 202 (which can be a display, a transitory or non-transitory computer-readable memory, an output port, a communication port, or others) of the processing device 100.

The exposure time fusion step S12 can be done using an exposure fusion algorithm, for example by combining sets of respective top view image $I_j$ with different exposure times $ET_j$ using pixel-wise linear combinations as shown in the equation below, with the automatically computed weights $w_j$, wherein Ij is the j-th respective top view image $I_j$, M is the number of respective top view images $I_j$ acquired with the j-th respective exposure time $ET_j$, $w_j$ is the weight of the j-th exposure time $ET_j$, and I is the fused image:

$$I = \sum_{j=1}^{M} w_j \cdot I_j$$

The fusion of the images enables to have a high dynamic range.

According to an embodiment of the invention, each respective weight $w_j$ is a function growing with the respective exposure time $ET_j$.

According to an embodiment of the invention, each respective weight $w_j$ is proportional to the respective exposure time $ET_j$.

Spectral Support of Images

Figure 6:
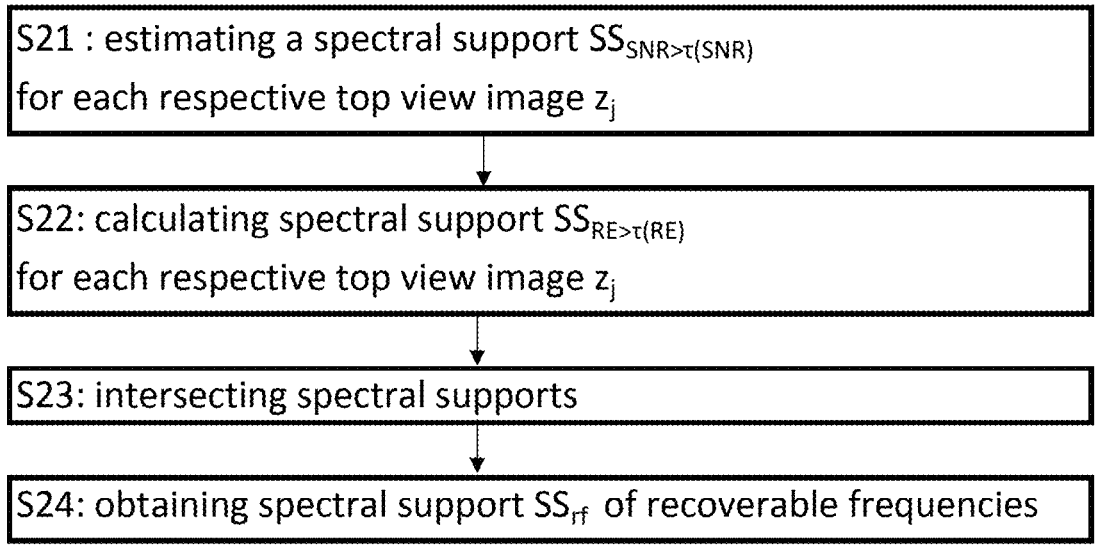
FIG. 6 shows steps of a method for processing images, taking into account spectral supports according to embodiments of the invention.

According to an embodiment of the invention, a third method for processing a sequence of respective top view images $I_j$ of a same terrestrial location, taking into account spectral supports of the respective top view images $I_j$ is provided, as shown on FIG. 6. This third method may comprise a step of estimating the support of recoverable frequencies with respect to at least one of the respective top view images $I_j$. This third method solves the problem that due to the motion of the overhead image acquisition device relative to the same scene or terrestrial location imaged by the respective top view images $I_j$, not all frequencies can be estimated using any sequence of the respective top view images $I_j$. Moreover this is also a function of the overhead image acquisition device. Depending on the optics of the overhead image acquisition device, some frequencies will never be available as either lost in noise or cut by the Modulation Transfer Function. The third method enables to estimate precisely the support of the recoverable frequencies since adding frequencies that cannot be recovered will only introduce noise, and might lead to other types of artifacts such as ringing artifacts at the end of the image processing. This third method may be combined or not with the methods described above.

According to the third method, each respective top view image $I_j$ having pixels is associated to a respective frequency representation and comprises a step S21 of estimating a first spectral support $SS_{SNR>\tau(SNR)}$ of frequencies of the respective top view images $I_j$, in which a signal-to-noise ratio of the respective top view images $I_j$ is higher than a signal-to-noise threshold $\tau(SNR)$ being higher than zero. This signal-to-noise ratio of the respective top view images $I_j$ is calculated for each respective top view images $I_j$.

In a step S22, a second spectral support $SS_{RE>\tau(RE)}$ of the frequencies of the respective top view images $I_j$, in which an energy RE (or relative energy) of the frequencies of the respective top view images $I_j$ is higher than an energy threshold $\tau(RE)$ being higher than zero, is calculated. This energy RE (or relative energy) of the frequencies of the respective top view images $I_j$ is calculated for each respective top view images $I_j$.

In a step S23, the first spectral support $SS_{SNR>\tau(SNR)}$ is intersected with the second spectral support $SS_{RE>\tau(RE)}$ to obtain a third spectral support SS of the frequencies of the respective top view images $I_j$, i.e. $SS = SS_{SNR>\tau(SNR)} \cap SS_{RE>\tau(RE)}$.

In a step S24, a spectral support $SS_{rf}$ of recoverable frequencies of the respective top view images $I_j$ is obtained from the third spectral support SS of the frequencies of the respective top view images $I_j$. This spectral support $SS_{rf}$ of recoverable frequencies may be equal to the third spectral support SS of the frequencies of the respective top view images $I_j$ or may be different from the third spectral support SS of the frequencies of the respective top view images $I_j$.

According to an embodiment of the invention, the step S24 of obtaining the spectral support $SS_{rf}$ of recoverable frequencies of the respective top view images $I_j$ comprises intersecting the third spectral support SS of the frequencies of the respective top view images with a fourth determined spectral support $SS_{imaging-instrument}$ of the frequencies of the respective top view images $I_j$, corresponding to an imaging instrument of an overhead image acquisition device, by which the respective top view images $I_j$ of the same terrestrial location are acquired.

According to an embodiment of the invention, $SS_{rf} = SS_{SNR>\tau(SNR)} \cap SS_{RE>\tau(RE)} \cap SS_{imaging-instrument}$.

According to embodiments of the invention, only two of the fourth determined spectral support $SS_{imaging-instrument}$, of the first spectral support $SS_{SNR>\tau(SNR)}$ and of the second spectral support $SS_{RE>\tau(RE)}$ are intersected to calculate the spectral support $SS_{rf}$ of recoverable frequencies of the respective top view images $I_j$.

The above-mentioned supports can be estimated globally (one spectral support for the whole images) or locally (a spectral support for each region of the images).

A processed image may be calculated based on the spectral support $SS_{rf}$ of recoverable frequencies by the device 100 and the processed image and/or the spectral support $SS_{rf}$ of recoverable frequencies may be supplied on the output 202 (which can be a display, a transitory or non-transitory computer-readable memory, an output port, a communication port, or others) of the processing device 100.

Noise Level Estimation

According to an embodiment of the invention, a fourth method for processing a sequence of respective top view images $I_j$ of a same terrestrial location, taking into account signal-to-noise ratios of the respective top view images $I_j$ is provided, as shown on FIG. 7. This fourth method may be combined or not with the methods described above. This fourth method may comprise removing or reducing noise, which was previously estimated, from at least one of the respective top view images $I_j$. Since the respective top view images $I_j$ may be affected by noise, a video or multi-image denoising step can be applied before detecting moving objects and fusing the images. This denoising step has the effect of reducing the noise level in the images (either locally or globally) in order to produce a better super-resolved result. Denoising can also be included in the super-resolution step. This denoising step can be done on each image independently or it can exploit the relationship between images (namely the temporal information). For example a video denoising can be used to process all images jointly. It is very important that the denoising step does not deteriorate any information contained in the images that can be used by the super-resolution step. In one implementation of the denoising method, self-similarity of the images is exploited through the fusion of spatial and temporal local patches to denoise the acquired images.

This fourth method takes into account the degradation due to the presence of noise. This fourth method may further comprise a step of estimating noise in at least one of the respective top view images $I_j$. It can be done per image $I_j$ or using multiple images $I_j$. This estimation may be done in a manner that takes into account the manner in which images or video is acquired, as different acquisition conditions will affect the noise level. The noise level that is estimated for the set of images is used to drive the fusion algorithm. Accordingly, in some implementations, the noise level is estimated in the set of images and may be used to denoise the images prior to a fusion step S33 described below.

According to the fourth method, in a step S31 a respective signal-to-noise ratio $SNR_j$ is estimated for each respective top view image $I_j$.

At least two of respective signal-to-noise ratio $SNR_j$ are different from each other. For example, one (or more) first of the respective signal-to-noise ratio $SNR_j$, called first respective signal-to-noise ratio $SNR_{j1}$, is higher than one (or more) other of the respective signal-to-noise ratio $SNR_j$, called second respective signal-to-noise ratio $SNR_{j2}$. The signal-to-noise ratios $SNR_j$ different from each other for the respective top view images $I_j$ may be due either to a different exposure time or to a change in the gain of the sensor enabling a bracketted acquisition to get a higher dynamic range.

In a step S32, a respective weight $v_j$ is calculated for each respective signal-to-noise ratio $SNR_j$. The respective weight $v_{j1}$ calculated for the first respective signal-to-noise ratio $SNR_{j1}$ is higher than the respective weight $v_{j2}$ calculated for the second respective signal-to-noise ratio $SNR_{j2}$, i.e. $v_{j2} > v_{j1}$ for $SNR_{j1} > SNR_{j2}$.

In a step S33, the respective top view images $I_j$ are fused into a fused image by linearly and pixel-wise combining the respective top view images $I_j$ weighted with the respective weights $v_j$. This fused image is calculated by the device 100 and is supplied on the output 202 (which can be a display, a transitory or non-transitory computer-readable memory, an output port, a communication port, or others) of the processing device 100.

The fusion step S33 can be done using a fusion algorithm, for example by combining sets of respective top view image $I_j$ with different signal-to-noise ratios $SNR_j$ using pixel-wise linear combinations as shown in the equation below, with the automatically computed weights $v_j$, wherein Ij is the j-th respective top view image $I_j$, M is the number of respective top view images $I_j$ acquired with the j-th signal-to-noise ratio $SNR_j$, $v_j$ is the weight of the j-th signal-to-noise ratio $SNR_j$, and I is the fused image:

$$I = \sum_{j=1}^{M} v_j . I_j$$

According to an embodiment of the invention, each respective weight $v_j$ is a function growing with the signal-to-noise ratio $SNR_j$.

According to an embodiment of the invention, each respective weight $v_j$ is proportional to the signal-to-noise ratio $SNR_j$.

Super-Resolved Image Obtained

One or more of the above-mentioned features enable to obtain from the respective top view images $I_j$ a super-resolved image $u_b$ or high-resolution image $u_b$. Using at least one of the registered images $I_j$, in which noise may be reduced or removed, in which moving objects may be fixed, and/or on which an exposure fusion step may have been executed as previously described herein, a super-resolved image associated with one or with each reference image may be constructed.

Of course, the aspects, embodiments, features, possibilities, steps, operations and examples of the disclosure mentioned above may be combined one with another or may be selected independently one from another.

The invention claimed is:

1. A method for processing a sequence of respective top view images of a same terrestrial location, each respective top view image having pixels and pixel values, comprising the following steps:

choosing one image, called reference image, among the respective top view images, estimating for each respective top view image a respective geometric deformation between the respective top view image and the reference image, computing by the respective geometric deformations respective subpixel positions of the respective top view images relative to one high-resolution coordinate system, interpolating at the respective subpixel positions to sample at least part of at least some of the respective top view images on a prescribed grid to obtain a high-resolution image.

2. The method according to claim 1, wherein the respective geometric deformation comprises a respective homography.

3. The method according to claim 1, wherein the respective geometric deformation comprises a respective affinity.

4. The method according to claim 1, wherein the respective geometric deformation comprises a respective affinity and a respective translation field.

5. The method according to claim 1, wherein the interpolating comprises interpolating the respective subpixel positions by a n-th order spline interpolation.

6. The method according to claim 5, wherein the interpolating comprises estimating for each at least part of at least some of the respective top view images a respective vector of spline coefficients, which makes the n-th order spline interpolation coincide with the respective top view image at the respective subpixel positions for n being an integer varying between 1 and a prescribed fixed integer N higher than 1.

7. The method according to claim 6, wherein the n-th order spline interpolation is equal to $$\varphi^{(n)}(x_1, x_2) = \sum_{i_1 \in \mathbb{Z}, i_2 \in \mathbb{Z}} c_{i_1,i_2} \beta^{(n)}(x_1 - i_1) \beta^{(n)}(x_2 - i_2)$$

wherein $x_1$ is a first coordinate along a first axis of the high-resolution image in the high-resolution coordinate system, $x_2$ is a second coordinate along a second axis of the high-resolution image perpendicular to the first axis in the high-resolution coordinate system, $C=(c_{i_1, i_2})$ is the respective vector of spline coefficients for $i_1$ being an integer varying from 1 to $N_1$ and for $i_2$ being an integer varying from 1 to $N_2$, $N_1$ is a first number of spline coefficients in the first axis and is higher than 1, $N_2$ is a second number of spline coefficients in a second axis and is higher than 1, wherein c, $i_1$, $i_2$ are defined such that $\varphi^{(n)}(\xi_{1,k}, \xi_{2,k})$, $(\xi_{1,k}, \xi_{2,k})$ are the respective subpixel positions on the first axis and on the second axis, u is the at least part of at least some of the respective top view images, $\beta^{(n)}$ is a function defined as $$\beta^{(0)}(x) = \begin{cases} 1 & \text{when } -1/2 < x < 1/2 \\ 1/2 & \text{when } x = \pm 1/2 \\ 0 & \text{otherwise} \end{cases}$$

$$\beta^{(n+1)} = \beta^{(n)} * \beta^{(0)}.$$

8. The method according to claim 7, wherein the interpolating comprises estimating the respective vector of spline coefficients by finding $$\arg\min_{c} \|z - Bc\|_2^2,$$

wherein z is a vector of the at least part of at least some of the respective top view images and has P lines, $\beta$ is a matrix having P lines and $N_1*N_2$ columns, whose matrix coefficients are equal to $$(\beta^{(N)}(\xi_{1,k} - i_1)\beta^{(n)}(\xi_{2,k} - i_2))_{k,(i_1, i_2)}$$

wherein P is an integer higher than 1.

9. The method according to claim 8, wherein the interpolating comprises estimating the respective vector of spline coefficients by using conjugate gradient to find c such that $B^T Bc = B^T z$, wherein $B^T$ is the transpose of B.

10. The method according to claim 1, further comprising defining a blur kernel k' having a spectrum whose attenuation in a frequency domain is a product of at least a first component being a radial contrast attenuation and of a second component being modeled as a transition in the frequency domain between an integration filter of the pixels of the high-resolution image which have a dimension equal to 1/f and a filter corresponding to pixels of dimension 1, wherein f is a prescribed factor of super-resolution and is higher than 1, processing the high-resolution image by deconvolving the high-resolution image by dividing a spectrum of the high-resolution image by a spectrum of the blur kernel k' to obtain a processed image.

11. The method according to claim 10, wherein the first component being a radial contrast attenuation is a low-pass frequency function.

12. The method according to claim 11, wherein the low-pass frequency function is $C(|\omega|) = (a|\omega|+1)^{-1}$, wherein a is prescribed fixed value, $\omega$ is a pulsation equal to $\sqrt{\omega_x^2 + \omega_y^2}$ wherein $\omega_x$ is a first pulsation in the frequency domain and corresponds to a first axis of the high-resolution image, wherein $\omega_y$ is a second pulsation in the frequency domain and corresponds to a second axis of the high-resolution image perpendicular to the first axis.

13. The method according to claim 10, wherein the second component is equal to $S(\omega_x, \omega_y) = \text{sinc}(f.\omega_x) \cdot \text{sinc}(f.\omega_y) \cdot (\text{sinc}(\omega_x) \cdot \text{sinc}(\omega_y))^{-1}$, wherein $\omega_x$ is a first pulsation in the frequency domain and corresponds to a first axis of the high-resolution image, wherein $\omega_y$ is a second pulsation in the frequency domain and corresponds to a second axis of the high-resolution image perpendicular to the first axis.

14. The method according to claim 10 wherein the attenuation of the spectrum of the blur kernel k' in the frequency domain is the product of at least the first component, of the second component and of a third component which is a point spread function of the respective top view images.

15. The method according to claim 10, wherein the deconvolving comprises finding as processed image an image defined by $$\arg\min_{u_s} \|u_s * k' - u_b\|_2^2 + \lambda_1 \|\nabla u_s\|_1 + \lambda_2 \|\nabla u_s\|_2^2$$

wherein k' is the blur kernel, $u_b$ is the high-resolution image, $\lambda_1$ is a first fixed predetermined coefficient, $\lambda_2$ is a second fixed predetermined coefficient, $\|\nabla u_s\|_l$ is a L1 norm of a gradient of the processed image $u_s$, $\|\nabla u_s\|_2^2$ is a squared L2 norm of a gradient of the processed image $u_s$.

16. The method according to claim 1, wherein the interpolating comprises interpolating the respective subpixel positions by a Fourier interpolation.

17. The method according to claim 16, wherein the Fourier interpolation F is equal to $$\mathcal{F}(x_1, x_2) = \sum_{\omega_1, \omega_2} v_{\omega_1, \omega_2} e^{-2\pi i (x_1 \omega_1 + x_2 \omega_2)}$$

wherein $x_1$ is a first coordinate along a first axis of the high-resolution image in the high-resolution coordinate system, $x_2$ is a second coordinate along a second axis of the high-resolution image perpendicular to the first axis in the high-resolution coordinate system, wherein $v = v_{\omega_1, \omega_2}$ is a Fourier spectrum value at a bidimensional pulsation $(\omega_1, \omega_2)$, wherein $\omega_1$ is a first pulsation in a frequency domain of the Fourier spectrum and corresponds to the first axis of the high-resolution image, wherein $\omega_2$ is a second pulsation in a frequency domain of the Fourier spectrum and corresponds to the second axis of the high-resolution image perpendicular to the first axis.

18. The method according to claim 17, wherein the Fourier interpolation comprises estimating the Fourier spectrum values $v = v_{\omega_1, \omega_2}$ by finding $$\arg\min_{v} \|z - Fv\|_2^2$$

wherein z is a vector of the pixel values of the at least part of at least some of the respective top view images and has P lines, F is a matrix, whose matrix coefficients are equal to $$(e^{-2\pi i (\xi_{1,k} \omega_1 + \xi_{2,k} \omega_2)})_{k, (\omega_1, \omega_2)}$$

wherein $(\xi_{1,k}, \xi_{2,k})$ are the respective subpixel positions on the first axis and on the second axis.

19. The method according to claim 1, further comprising detecting saturated pixel values in the at least some of the respective top view images and eliminating saturated pixel values from at least some of the respective top view images to obtain the at least part of at least some of the respective top view images.

20. The method according to claim 19, wherein detecting saturated pixel values in the at least some of the respective top view images comprises comparing each pixel value to a prescribed pixel saturation threshold, wherein the pixel value is detected as being saturated when the pixel value is higher than the prescribed pixel saturation threshold.

21. The method according to claim 1, further comprising detecting a moving object in the pixel values of the at least some of the respective top view images and replacing the pixel values detected as being a moving object in the at least part of at least some of the respective top view images by corresponding pixel values of the reference image at the subpixel positions closest to the pixel values detected.

22. The method according to claim 21, wherein the moving object is detected when)

$$|z_k - I_r(\xi_{1,k}, \xi_{2,k})| > \tau$$

wherein $\tau$ is a prescribed moving object threshold,
$(\xi_{1,k}, \xi_{2,k})$ are the respective subpixel positions,
$z_k$ is a pixel value of the at least part of at least some of the respective top view images,
$I_r$ is the reference image,
$I_r(\xi_{1,k}, \xi_{2,k})$ are the corresponding pixel values of the reference image at the subpixel positions.

23. The method according to claim 21, wherein the moving object is detected when $$\sum_{w_1=-W_1}^{W_1} \sum_{w_2=-W_2}^{W_2} |I_j(x_1+w_1, x_2+w_2) - I_r(G_j(x_1+w_1, x_2+w_2))| > \tau$$

wherein $\tau$ is a prescribed moving object threshold,
$x_1$ is a first coordinate of the pixel along a first axis of the respective top view image,
$x_2$ is a second coordinate of the pixel along a second axis of the respective top view image perpendicular to the first axis, $w_1$ is an integer varying from $-W_1$ to $W_1$,
$w_2$ is an integer varying from $-W_2$ to $W_2$,
$W_1$ is a first window dimension along the first axis and around the pixel,
$W_2$ is a second window dimension along the second axis and around the pixel,
$I_j$ are the pixel values of the at least part of at least some of the respective top view images,
$I_r$ is the reference image,
$G_j$ is the respective geometric deformation.

24. The method according to claim 1, wherein the respective geometric deformation is estimated using an inverse compositional algorithm.

25. The method according to claim 1, further comprising estimating whether the respective geometric deformations are similar one to another,
wherein the respective top view image for which the respective geometric deformation is not similar to others of the respective geometric deformations is eliminated to obtain the at least some of the respective top view images.

26. A device for processing a sequence of respective top view images of a same terrestrial location, each respective top view image having pixels and pixel values, the device comprising a processor configured to:
choose one image, called reference image, among the respective top view images,
estimate for each respective top view image a respective geometric deformation between the respective top view image and the reference image,
compute by the respective geometric deformations respective subpixel positions of the respective top view images relative to one high-resolution coordinate system,
interpolate at the respective subpixel positions to sample at least part of at least some of the respective top view images on a prescribed grid to obtain a high-resolution image.

27. A non-transitory computer-readable storage medium having instructions thereon that, when executed by a processor, cause the processor to execute operations for processing a sequence of respective top view images of a same terrestrial location, each respective top view image having pixels and pixel values, the operations comprising:
choosing one image, called reference image, among the respective top view images,
estimating for each respective top view image a respective geometric deformation between the respective top view image and the reference image,
computing by the respective geometric deformations respective subpixel positions of the respective top view images relative to one high-resolution coordinate system,
interpolating at the respective subpixel positions to sample at least part of at least some of the respective top view images on a prescribed grid to obtain a high-resolution image.

* * * * *